United States Patent
Yamazaki

(10) Patent No.: US 10,775,317 B2
(45) Date of Patent: Sep. 15, 2020

(54) PRINTED MATTER INSPECTION DEVICE AND PRINTED MATTER INSPECTION METHOD

(71) Applicant: FUJIFILM Corporation, Tokyo (JP)

(72) Inventor: Yoshirou Yamazaki, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 74 days.

(21) Appl. No.: 16/253,357

(22) Filed: Jan. 22, 2019

(65) Prior Publication Data

US 2019/0154590 A1    May 23, 2019

Related U.S. Application Data

(63) Continuation of application No. PCT/JP2017/026116, filed on Jul. 19, 2017.

(30) Foreign Application Priority Data

Jul. 29, 2016  (JP) .................................. 2016-149787

(51) Int. Cl.
   *G01N 21/89*  (2006.01)
   *G01N 21/892* (2006.01)
   (Continued)

(52) U.S. Cl.
   CPC ......... *G01N 21/8921* (2013.01); *G01N 21/88* (2013.01); *G01N 21/8901* (2013.01);
   (Continued)

(58) Field of Classification Search
   CPC ................... B41J 2/2142; B41J 29/393; B41J 2002/14459; B41J 2202/21; B41J 2/0458;
   (Continued)

(56) References Cited

U.S. PATENT DOCUMENTS 5,177,621 A * 1/1993 Ohtaki ............... H04N 1/00002
                                          358/405
5,974,160 A * 10/1999 Shiratori ................ G01N 21/57
                                          382/112
(Continued)

FOREIGN PATENT DOCUMENTS

JP    2007-034648 A    2/2007
JP    2007-172512 A    7/2007
(Continued)

OTHER PUBLICATIONS

Jing et al.; "Masking Mediated Print Defect Visibility Predictor"; Image Quality and System Performance IX; SPIE; Jan. 22, 2012; pp. 1-11; vol. 8293, No. 1; US.
(Continued)

*Primary Examiner* — Aklilu K Woldemariam
(74) *Attorney, Agent, or Firm* — Studebaker & Brackett PC

(57) ABSTRACT

Provided are a printed matter inspection device and a printed matter inspection method for appropriately determining visibility of a streaky concentration defect, regardless of the size of a variation of pixel values of an image.
A printed matter inspection device determines visibility of a streak from a basic streak intensity that is an intensity of the streak detected from a printed matter, color information and frequency feature information on a streak near-field area that is continuous from an area of the streak and has a variation of image feature amounts that is within a predetermined first range, and frequency feature information on an outer peripheral area that is in contact with the streak near-field area, and determines whether the quality of the printed matter is good or not on the basis of at least the visibility.

14 Claims, 22 Drawing Sheets

(51) Int. Cl.
*G06T 7/00* (2017.01)
*G06T 1/00* (2006.01)
*G01N 21/88* (2006.01)
*G06T 7/90* (2017.01)

(52) U.S. Cl.
CPC ............ *G01N 21/892* (2013.01); *G06T 1/00* (2013.01); *G06T 7/00* (2013.01); *G06T 7/001* (2013.01); *G06T 7/0004* (2013.01); *G06T 7/90* (2017.01); *G06T 2207/20021* (2013.01); *G06T 2207/30144* (2013.01)

(58) Field of Classification Search
CPC ...... B41J 2/04581; B41J 2/155; B41J 2/2146; G01N 21/8921; G01N 21/8901; G06K 9/2063; G06K 9/6201; G06K 15/02; G06T 2207/30144; G06T 7/0002; G06T 7/0004; G06T 7/001; G06T 2207/10008; G06T 1/00; H04N 1/00002; H04N 1/00029; H04N 1/00031; H04N 1/00005; H04N 1/00045; H04N 1/0005; H04N 1/00058; H04N 1/00013; H04N 1/00053; H04N 1/00063; H04N 1/401; H04N 1/4015; H04N 7/183; B41F 33/0036; B41F 33/02; G03G 15/283; G01S 7/4808; G01S 7/481; A61B 3/0025; G01B 9/02032; G01B 9/02072
USPC ........................ 382/112, 149; 358/405, 406
See application file for complete search history.

(56) References Cited

U.S. PATENT DOCUMENTS

| | | | | | |
|---|---|---|---|---|---|
| 5,999,636 | A | * | 12/1999 | Juang | ............... B41F 33/02 250/559.05 |
| 6,106,094 | A | * | 8/2000 | Otani | ............... B41J 29/393 347/19 |
| RE37,157 | E | * | 5/2001 | Ikeda | ............... G03G 15/22 271/184 |
| 9,946,944 | B2 | * | 4/2018 | Yamazaki | ............... B41J 29/46 |
| 2005/0179736 | A1 | * | 8/2005 | Mataki | ............... B41J 2/04563 347/54 |
| 2005/0195234 | A1 | * | 9/2005 | Kachi | ............... B41J 2/14056 347/15 |
| 2006/0078168 | A1 | * | 4/2006 | Takahara | ............... B41F 33/0036 382/112 |
| 2007/0013731 | A1 | * | 1/2007 | Tatsumi | ............... B41J 2/2135 347/15 |
| 2007/0132804 | A1 | * | 6/2007 | Chiwata | ............... B41J 2/0451 347/19 |
| 2009/0079782 | A1 | * | 3/2009 | Sasayama | ............... B41J 29/393 347/19 |
| 2012/0121139 | A1 | | 5/2012 | Kojima et al. | |
| 2012/0154477 | A1 | * | 6/2012 | Yamazaki | ............... B41J 2/2146 347/19 |
| 2012/0154837 | A1 | * | 6/2012 | Yamazaki | ............... H04N 1/4015 358/1.9 |
| 2014/0092419 | A1 | | 4/2014 | Yamagishi | |
| 2017/0087910 | A1 | * | 3/2017 | Nagashima | ............... B41J 2/01 |
| 2017/0282535 | A1 | * | 10/2017 | Shibata | ............... B41J 2/04586 |
| 2018/0086049 | A1 | * | 3/2018 | Ueshima | ............... B41J 2/2142 |
| 2018/0096472 | A1 | * | 4/2018 | Ukishima | ............... G06K 9/036 |

FOREIGN PATENT DOCUMENTS

| | | |
|---|---|---|
| JP | 2008-080566 A | 4/2008 |
| JP | 2012-103225 A | 5/2012 |
| JP | 2015-221514 A | 12/2015 |
| JP | 2016-062575 A | 4/2016 |

OTHER PUBLICATIONS

The extended European search report issued by the European Patent Office dated Apr. 17, 2019, which corresponds to European Patent Application No. 17834122.8-1210 and is related to U.S. Appl. No. 16/253,357.

International Search Report issued in PCT/JP2017/026116; dated Oct. 3, 2017.

International Preliminary Report on Patentability and Written Opinion issued in PCT/JP2017/026116; dated Jan. 29, 2019.

* cited by examiner

PRINTED MATTER INSPECTION DEVICE AND PRINTED MATTER INSPECTION METHOD

CROSS-REFERENCE TO RELATED APPLICATIONS

The present application is a Continuation of PCT International Application No. PCT/JP2017/026116 filed on Jul. 19, 2017 claiming priority under 35 U.S.C § 119(a) to Japanese Patent Application No. 2016-149787 filed on Jul. 29, 2016. Each of the above applications is hereby expressly incorporated by reference, in their entirety, into the present application.

BACKGROUND OF THE INVENTION

1. Field of the Invention

The present invention relates to a printed matter inspection device and a printed matter inspection method, and particularly, to a technique for performing determining whether the quality of a printed matter is good or not on the basis of visibility of an image defect.

2. Description of the Related Art

An inspection device that inspects a printed matter is known in the art. For example, JP2012-103225A discloses an inspection device that analyzes a flatness indicating a variation of pixel values of a pattern or the like in an obtained standard image, switches an inspection threshold value for each type of image area in a picture line part on the basis of the flatness of the analysis result, compares pixels of the standard image in the image area with pixels of an inspection target image, determines whether a difference between the pixel values exceeds a threshold value, and inspects a defect place on a printing surface on the basis of the determination result.

SUMMARY OF THE INVENTION

There is a case where a streaky concentration defect occurs in a printed matter. Between a case where such a concentration defect occurs in an area where a variation of pixel values is large and a case where such a concentration defect occurs in an area where the variation of the pixel values is small, the degree of recognition when a person views the printed matter with the eyes, that is, visibility becomes different, and an influence on the printing quality becomes different.

However, in the inspection device disclosed in JP2012-103225A, the flatness becomes different according to a range where the flatness is calculated in an image with a large variation of pixel values. Further, in the image with the large variation of the pixel values, it is difficult to accurately predict visibility of a streaky concentration defect only using a simple flatness. Accordingly, it is difficult to perform inspection based on visibility with high accuracy.

The invention has been made in consideration of the above-mentioned problems, and an object of the invention is to provide a printed matter inspection device and a printed matter inspection method for appropriately determining visibility of a streaky concentration defect, regardless of the size of a variation of pixel values of an image.

According to an aspect of the printed matter inspection device, there is provided a printed matter inspection device comprising: a detection section that detects a streaky concentration defect that extends in a first direction from a printed matter; an intensity calculation section that calculates a basic streak intensity that is an intensity of the concentration defect; a streak near-field area specification section that specifies a streak near-field area that is continuous from an area of the concentration defect of the printed matter, in which a variation of image feature amounts is within a predetermined first range; a streak near-field area information acquisition section that acquires color information and frequency feature information on the streak near-field area; an outer peripheral area specification section that specifies an outer peripheral area that is in contact with the streak near-field area an outer peripheral area information acquisition section that acquires frequency feature information on the outer peripheral area; a visibility determination section that determines visibility of the concentration defect on the basis of the basic streak intensity, the color information and the frequency feature information on the streak near-field area, and the frequency feature information on the outer peripheral area and a determination section that determines whether the quality of the printed matter is good or not at least on the basis of the visibility.

According to this aspect, the streaky concentration defect that extends in the first direction from the printed matter is detected, the visibility of the concentration defect is determined on the basis of the basic streak intensity that is the intensity of the concentration defect, the color information and the frequency feature information on the streak near-field area in which the variation of the image feature amounts is within the predetermined first range, and the frequency feature information on the outer peripheral area that is in contact with the streak near-field area, and it is determined whether the quality of the printed matter is good or not at least on the basis of the visibility. Thus, it is possible to appropriately determine visibility of a streaky concentration defect with respect to an image with a large variation of pixel values.

It is preferable that the color information is information including a brightness, a saturation, and a hue. Since the color information includes the brightness, the saturation, and the hue, it is possible to appropriately determine visibility of a concentration defect.

It is preferable that the frequency feature information on the streak near-field area and the frequency feature information on the outer peripheral area are information including a direction and a frequency band. Since the frequency feature information includes the direction and the frequency band, it is possible to appropriately determine visibility of a concentration defect.

It is preferable that the outer peripheral area specification section specifies an outer peripheral area having a predetermined first size. Thus, it is possible to appropriately specify the outer peripheral area.

The outer peripheral area specification section may specify an outer peripheral area in which the variation of the image feature amounts is within a predetermined second range. Thus, it is possible to appropriately specify the outer peripheral area.

It is preferable that the visibility determination section includes a model that converts the basic streak intensity into a sensory evaluation value of the concentration defect, on the basis of the color information and the frequency feature information on the streak near-field area and the frequency feature information on the outer peripheral area, and determines the visibility of the concentration defect on the basis of the sensory evaluation value. Thus, it is possible to appropriately determine visibility of a streaky concentration defect.

It is preferable that the visibility determination section includes a first streak model that converts the basic streak intensity and the color information on the streak near-field area into a first streak sensory evaluation value, a second streak model that converts the first streak sensory evaluation value and the frequency feature information on the streak near-field area into a second streak sensory evaluation value, and a third streak model that converts the second streak sensory evaluation value and the frequency feature information on the outer peripheral area into a third streak sensory evaluation value, and determines the visibility of the concentration defect on the basis of the third streak sensory evaluation value. Thus, it is possible to appropriately determine visibility of a streaky concentration defect.

It is preferable that the detection section detects the concentration defect from a difference between standard image data and inspection image data obtained by reading the printed matter. Thus, it is possible to appropriately detect a streaky concentration defect.

It is preferable that the detection section divides the standard image data and the inspection image data into a plurality of areas, respectively, and detects the concentration defect from a difference between each divided area of the standard image data and each divided area of the inspection image data. In this way, by calculating the difference for each pair of the divided areas, it is possible to reduce a calculation time, and to enhance calculation accuracy.

It is preferable that the variation of the image feature amounts is a value relating to a variance value of pixel values of the inspection image data. Thus, it is possible to appropriately specify the streak near-field area.

It is preferable that the standard image data is data obtained by reading an accepted printed matter. Thus, it is possible to appropriately detect the concentration defect. Here, the accepted printed matter is a printed matter for a reference of inspection of the printed matter, and may employ a printed matter without having an image defect. Further, the data obtained by reading the accepted printed matter is not limited to output data of a read-out device, and includes data obtained by performing image processing such as resolution conversion with respect to the output data of the read-out device.

Further, the standard image data may be printing source data of the printed matter. Thus, it is possible to appropriately detect a concentration defect. Here, the printing source data is not limited to data of a printing data format, and includes data obtained by performing image processing such as raster image processor (RIP) processing with respect to printing source data of a printing data format.

According to another aspect of the invention, there is provided a printed matter inspection method comprising: a detection step of detecting a streaky concentration defect that extends in a first direction from a printed matter; an intensity calculation step of calculating a basic streak intensity that is an intensity of the concentration defect; a streak near-field area specification step of specifying a streak near-field area that is continuous from an area of the concentration defect of the printed matter, in which a variation of image feature amounts is within a predetermined first range; a streak near-field area information acquisition step of acquiring color information and frequency feature information on the streak near-field area; an outer peripheral area specification step of specifying an outer peripheral area that is in contact with the streak near-field area; an outer peripheral area information acquisition step of acquiring frequency feature information on the outer peripheral area, a visibility determination step of determining visibility of the concentration defect on the basis of the basic streak intensity, the color information and the frequency feature information on the streak near-field area, and the frequency feature information on the outer peripheral area and a determination step of determining whether the quality of the printed matter is good or not at least on the basis of the visibility.

According to this aspect, the streaky concentration defect that extends in the first direction from the printed matter is detected, the visibility of the concentration defect is determined on the basis of the basic streak intensity that is the intensity of the concentration defect, the color information and the frequency feature information on the streak near-field area in which the variation of the image feature amounts is within the predetermined first range, and the frequency feature information on the outer peripheral area that is in contact with the streak near-field area, and it is determined whether the quality of the printed matter is good or not at least on the basis of the visibility. Thus, it is possible to appropriately determine visibility of a streaky concentration defect with respect to an image with a large variation of pixel values.

According to another aspect of the invention, there is provided a computer-readable non-transitory recording medium that stores a printed matter inspection program causing a computer to execute: a detection step of detecting a streaky concentration defect that extends in a first direction from a printed matter; an intensity calculation step of calculating a basic streak intensity that is an intensity of the concentration defect; a streak near-field area specification step of specifying a streak near-field area that is continuous from an area of the concentration defect of the printed matter, in which a variation of image feature amounts is within a predetermined first range; a streak near-field area information acquisition step of acquiring color information and frequency feature information on the streak near-field area; an outer peripheral area specification step of specifying an outer peripheral area that is in contact with the streak near-field area; an outer peripheral area information acquisition step of acquiring frequency feature information on the outer peripheral area; a visibility determination step of determining visibility of the concentration defect on the basis of the basic streak intensity, the color information and the frequency feature information on the streak near-field area, and the frequency feature information on the outer peripheral area and a determination step of determining whether the quality of the printed matter is good or not at least on the basis of the visibility.

According to this aspect, the streaky concentration defect that extends in the first direction from the printed matter is detected, the visibility of the concentration defect is determined on the basis of the basic streak intensity that is the intensity of the concentration defect, the color information and the frequency feature information on the streak near-field area in which the variation of the image feature amounts is within the predetermined first range, and the frequency feature information on the outer peripheral area that is in contact with the streak near-field area, and it is determined whether the quality of the printed matter is good or not at least on the basis of the visibility. Thus, it is possible to appropriately determine visibility of a streaky concentration defect with respect to an image with a large variation of pixel values.

According to the invention, it is possible to appropriately determine visibility of a streaky concentration defect regardless of the size of a variation of pixel values of an image.

DESCRIPTION OF THE PREFERRED EMBODIMENTS

Hereinafter, preferred embodiments of the invention will be described with reference to the accompanying drawings.

[Problems of Inspection of Printed Matter]

In inspection of a printed matter, a method for determining whether the quality of the printed matter is good or not on the basis of the presence or absence of a streaky concentration defect is performed. A problem in such inspection of the printed matter will be described. Hereinafter, the streaky concentration defect is simply referred to as a streak.

First, a case where a variation of pixel values of an entire image is small will be described. Here, the pixel value refers to a value indicating brightness of a pixel, and for example, is expressed in 256 stages from 0 to 255 for each of red (R), green (G), and blue (B). Further, the variation of the pixel values refers to a variance value of the pixel values.

Figure 1:
FIG. 1 shows an example of an image having a relatively small variation of pixel values of an entire image.
Figure 2:
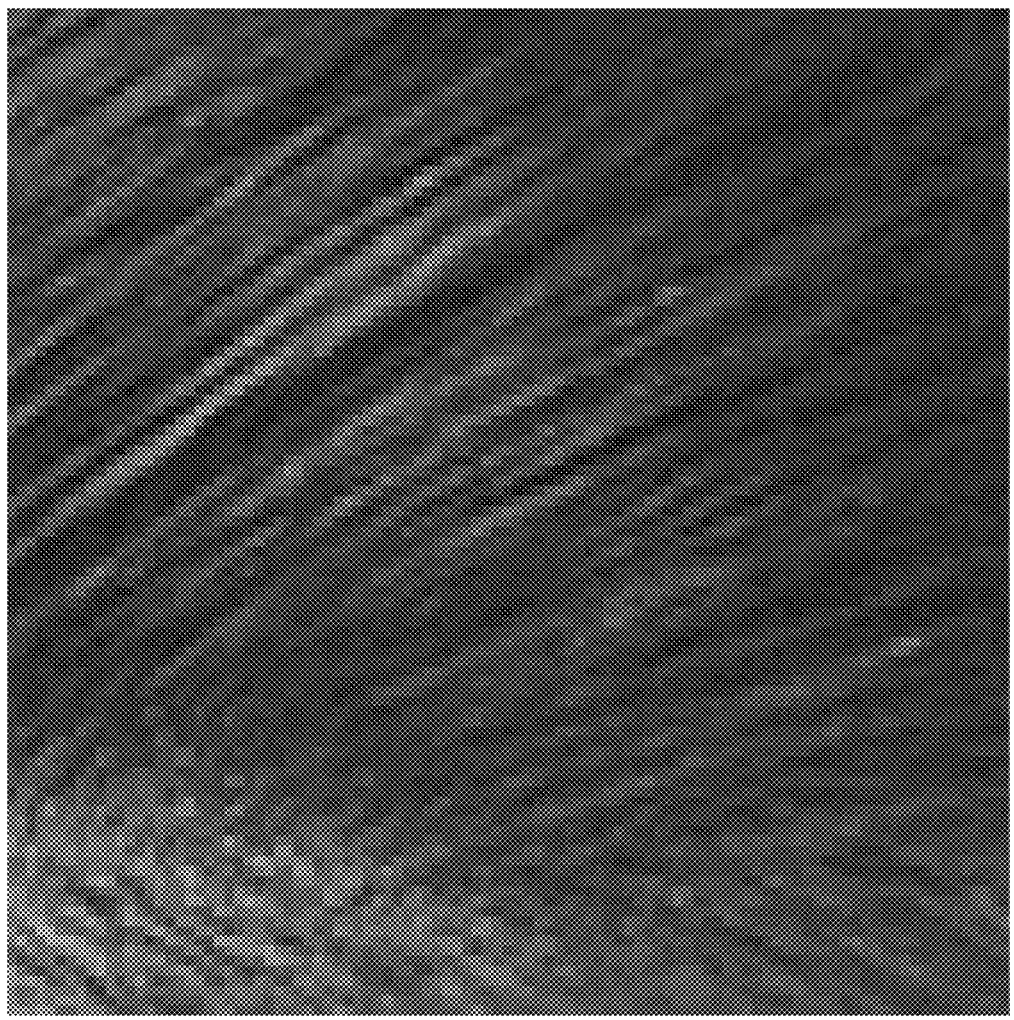
FIG. 2 shows an example of an image having a relatively small variation of pixel values of an entire image.

An example of an image that is printed on a printed matter and has a relatively small variation of pixel values of the entire image is shown in FIGS. 1 and 2. A real size of an image 1 shown in FIG. 1 corresponds to 25 mm×25 mm.

Figure 3:
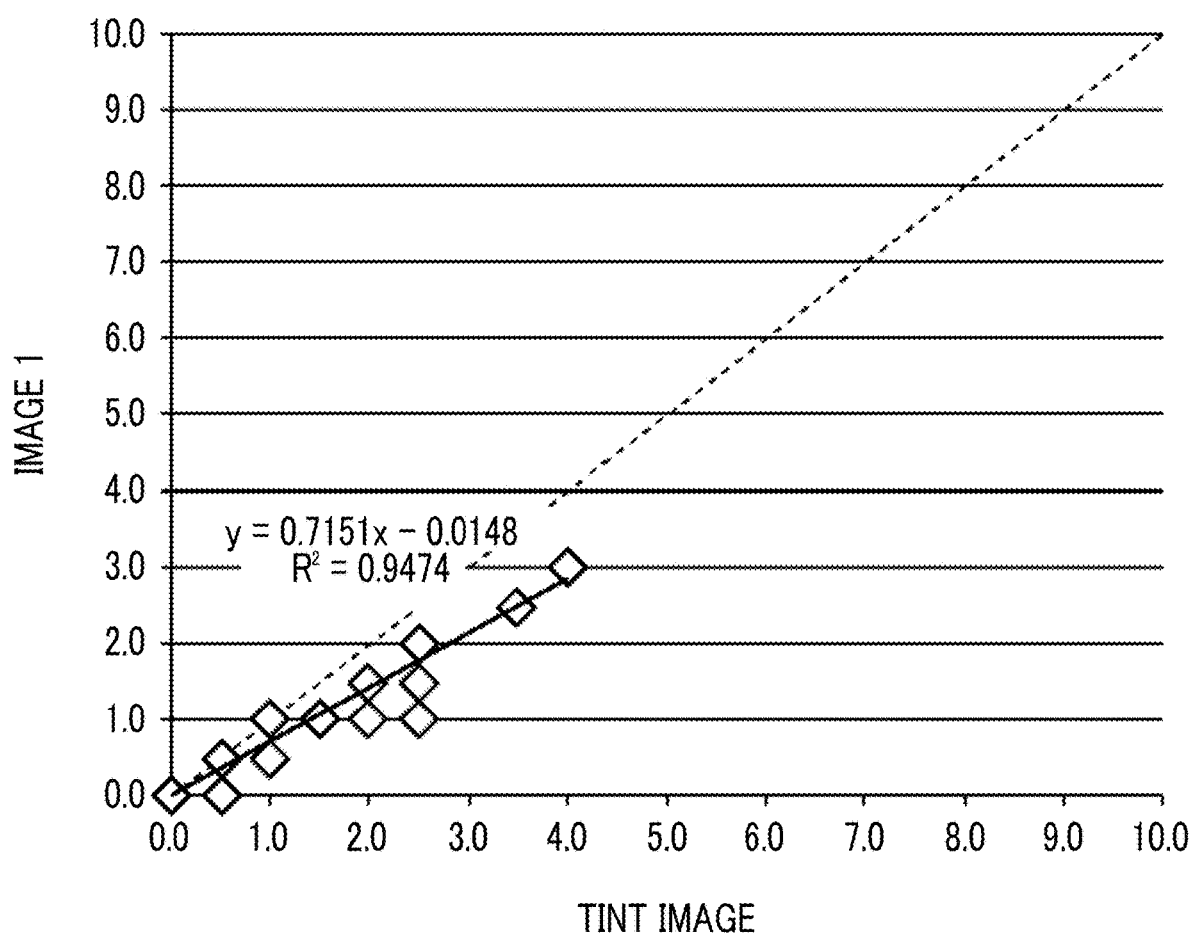
FIG. 3 is a diagram showing that a streak visual recognition intensity in a tint image and a streak visual recognition intensity in a practical image with a relatively small variation of pixel values are plotted.

Further, FIG. 3 is a diagram in which in a case where a white streak 2 having the same intensity is inserted with respect to respective images of the image 1 and a tint image (not shown) having the same concentration as that of the image 1 in a pseudo manner, a streak visual recognition intensity indicating an intensity of a streak visually recognized in the tint image is plotted on an X-axis that is a lateral axis and a streak visual recognition intensity in the image 1 is plotted on a Y-axis that is a longitudinal axis. An expression in the diagram represents a regression equation of plot points, and $R^2$ represents a coefficient of determination. Determination of the visual recognition intensity of the streak is performed in a determination area in a predetermined range provided on an image.

In a practical image with a relatively small variation of pixel values in the image, such as the image 1, a relationship between a streak visual recognition intensity in the practical image and a streak visual recognition intensity in a tint image becomes constant, regardless of the size of the determination area.

Figure 4:
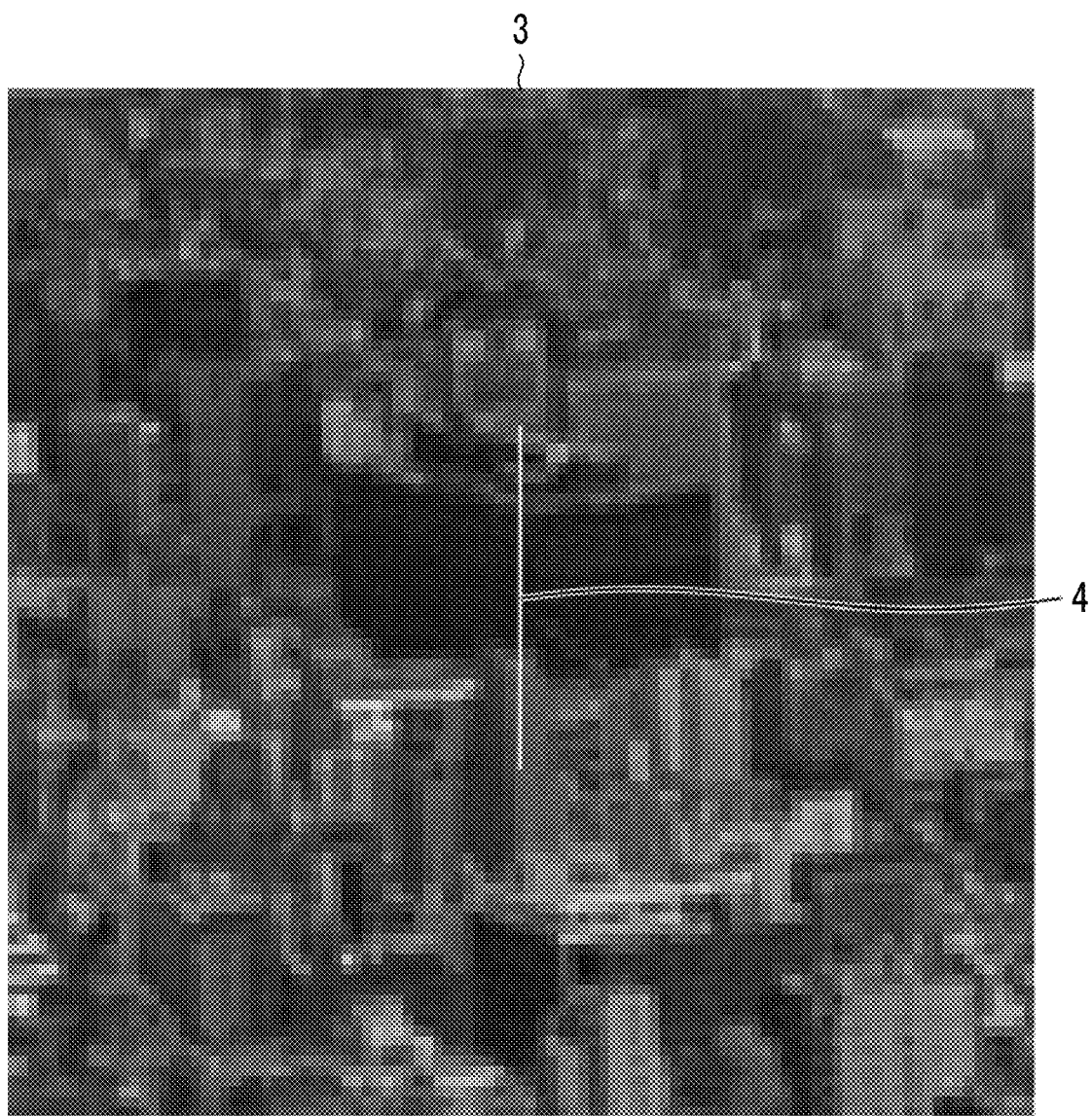
FIG. 4 shows an example of an image with a large variation of pixel values of an entire image.

On the other hand, an example of an image that is printed on a printed matter and has a larger variation of pixel values in the image than that in the image 1 is shown in FIG. 4. A real size of an image 3 shown in FIG. 4 corresponds to 25 mm×25 mm.

Figure 5:
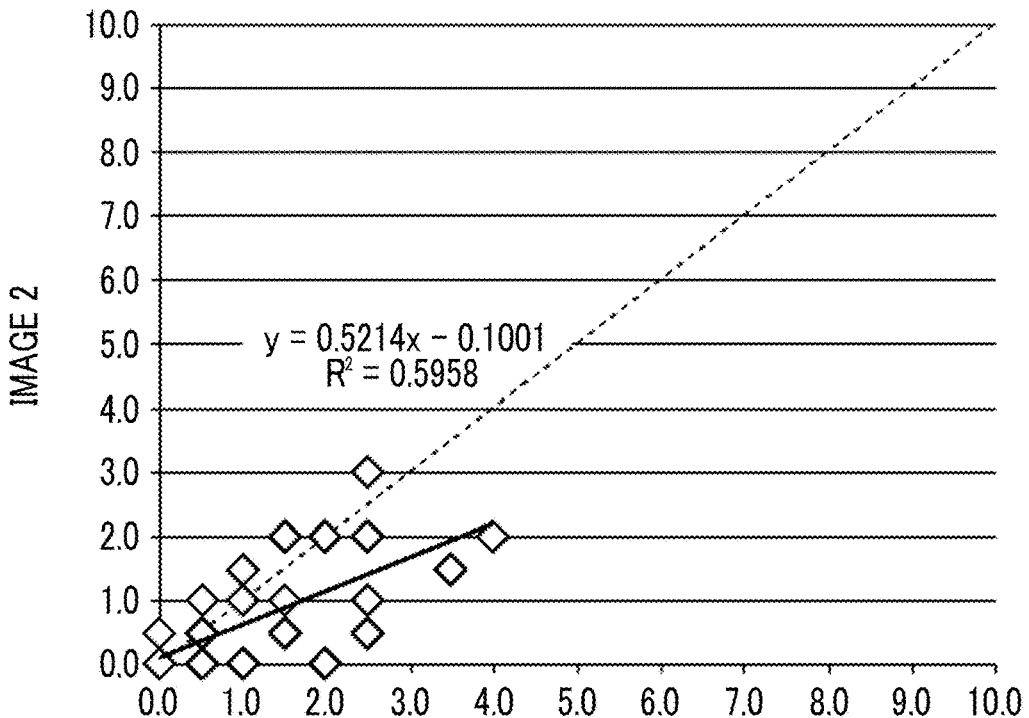
FIG. 5 is a diagram showing that a streak visual recognition intensity in a tint image in a case where a determination area is small and a streak visual recognition intensity in a practical image with a relatively large variation of pixel values are plotted.
Figure 6:
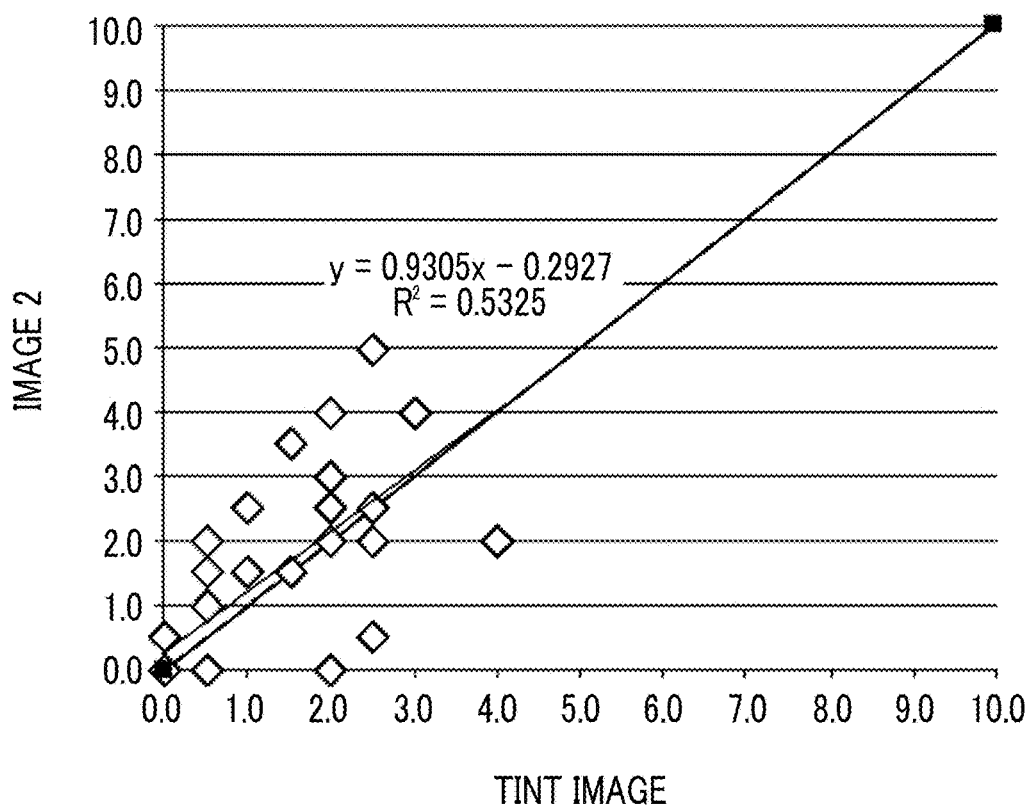
FIG. 6 is a diagram showing that a streak visual recognition intensity in a tint image in a case where a determination area is large and a streak visual recognition intensity in a practical image with a relatively large variation of pixel values are plotted.

Further. FIGS. 5 and 6 are diagrams in which in a case where a white streak 4 having the same intensity is inserted with respect to respective images of the image 3 and a tint image (not shown) having the same concentration as that of the image 3 in a pseudo manner, a streak visual recognition intensity in the tint image 1 is plotted on an X-axis that is a lateral axis, and a streak visual recognition intensity in the image 3 is plotted on a Y-axis that is a longitudinal axis, in which FIG. 5 shows a case where a determination area is set to have a large size of 8 mm×8 mm, and FIG. 6 shows a case where the determination area is set to have a size of 1 mm×1 mm to be smaller than that in the case of FIG. 5. An expression in the diagram represents a regression equation of plot points, and $R^2$ represents a coefficient of determination.

As shown in FIGS. 5 and 6, in a practical image with a relatively large variation of pixel values in the image, such as the image 3, a relationship between a streak visual recognition intensity in the practical image and a streak visual recognition intensity in a tint image becomes different in accordance with the size of a determination area.

In this way, the present inventors found out that a streak visual recognition intensity becomes different in accordance with the size of a determination area in an image with a relatively large variation of pixel values and with no constant image feature amount.

First Embodiment

[Configuration of Printed Matter Inspection Device]

Figure 7:
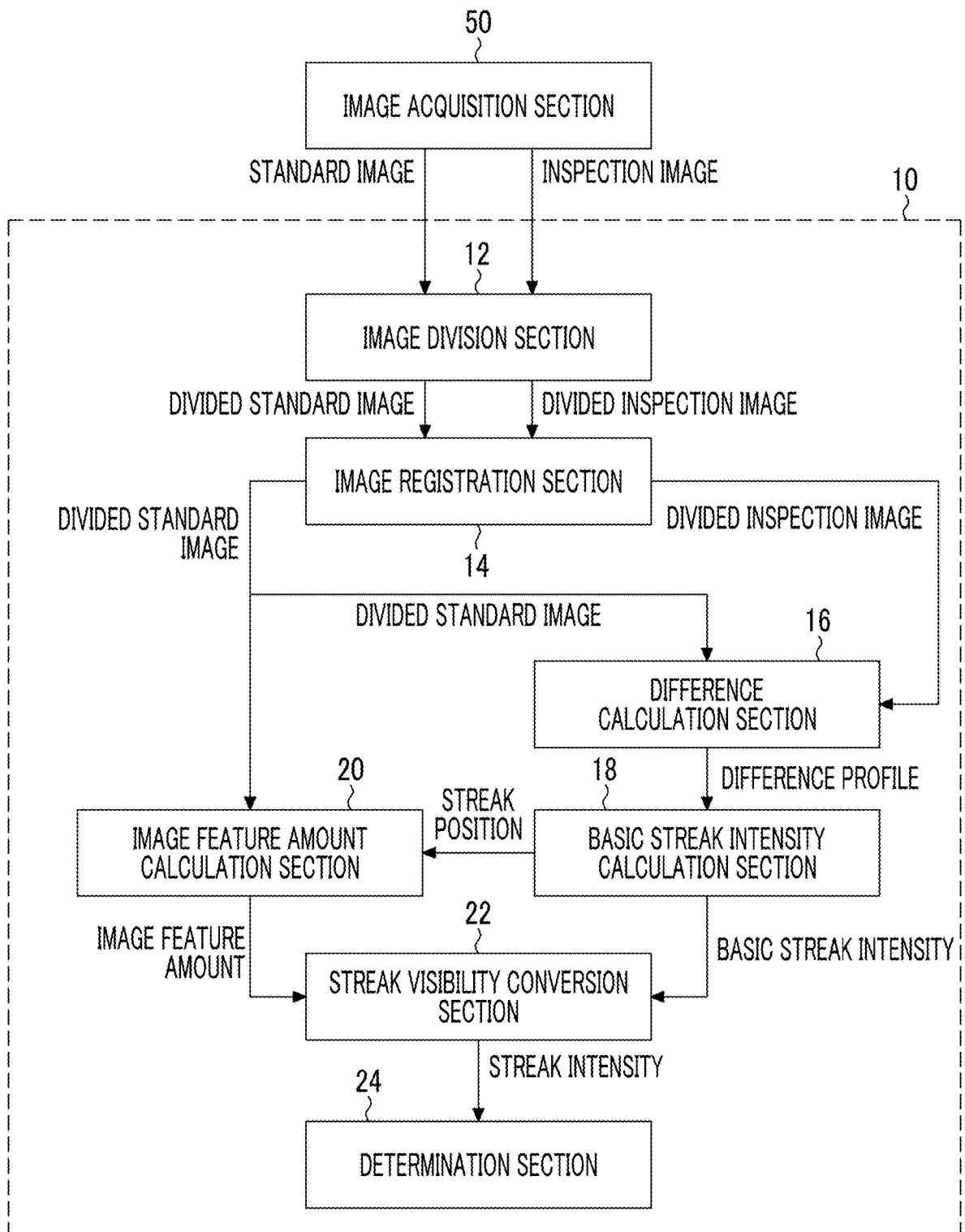
FIG. 7 is a block diagram showing an example of a system configuration of a printed matter inspection device.

FIG. 7 is a block diagram showing an example of a system configuration of a printed matter inspection device 10 according to a first embodiment. The printed matter inspection device 10 is a device that performs inspection of a printed matter on the basis of read-out data of the printed matter acquired from an image acquisition section 50, and includes an image division section 12, an image registration section 14, a difference calculation section 16, a basic streak intensity calculation section 18, an image feature amount calculation section 20, a streak visibility conversion section 22, a determination section 24, and the like.

The image acquisition section 50 is a scanner that color-separates a printed matter into three primary colors of red (R), green (G), and blue (B) to read the printed matter. The image acquisition section 50 reads an accepted printed matter, and generates a standard image (an example of standard image data) that is read-out data of the accepted printed matter. That is, the standard image is image data for each R, G, and B having a reading resolution of the image acquisition section 50.

Further, the image acquisition section 50 reads an inspection printed matter that is an inspection target, and generates an inspection image (an example of inspection image data) that is read-out data of the inspection printed matter. Accordingly, the inspection image is also image data for each R, G, and B having a reading resolution of the image acquisition section 50.

The printed matter inspection device 10 may be configured to include an image acquisition section 50.

The image division section 12 generally performs registration with respect to a standard image and an inspection image on the basis of a position or the like of a sheet edge, divides the inspection image after the registration into a plurality of divided inspection images of a predetermined size, and divides the standard image into a plurality of divided standard images at the same positions.

The image registration section 14 performs a detailed registration process between the divided inspection images and the divided standard images at positions corresponding to positions of the divided inspection images. This registration process may be performed using a known method, for example, a phase only correlation method.

The difference calculation section 16 (an example of a detection section) subtracts each pixel value at a corresponding position of the divided standard image after the registration from each pixel value of the divided inspection images to generate a difference image (an example of a difference between each pair of divided areas) Further, the difference calculation section 16 performs integration with respect to the difference image in a predetermined direction to create a difference profile for each of R, G, and B.

The basic streak intensity calculation section 18 detects a streak that extends in one direction (an example of a first direction) on the basis of the difference profile created by the difference calculation section 16, and calculates a basic streak intensity indicating a basic intensity of the detected streak. The basic streak intensity is an evaluation value that enables quantitative evaluation of basic visibility of the streak.

The image feature amount calculation section 20 calculates an image feature amount for each area of the divided standard images.

The streak visibility conversion section 22 (an example of a visibility determination section) calculates a streak intensity (an example of a sensory evaluation value) based on streak visibility, from the basic streak intensity calculated by the basic streak intensity calculation section 18 and the image feature amount calculated by the image feature amount calculation section 20.

The determination section 24 determines whether the quality of a printed matter is good or not on the basis of the streak intensity calculated by the streak visibility conversion section 22.

Figure 8:
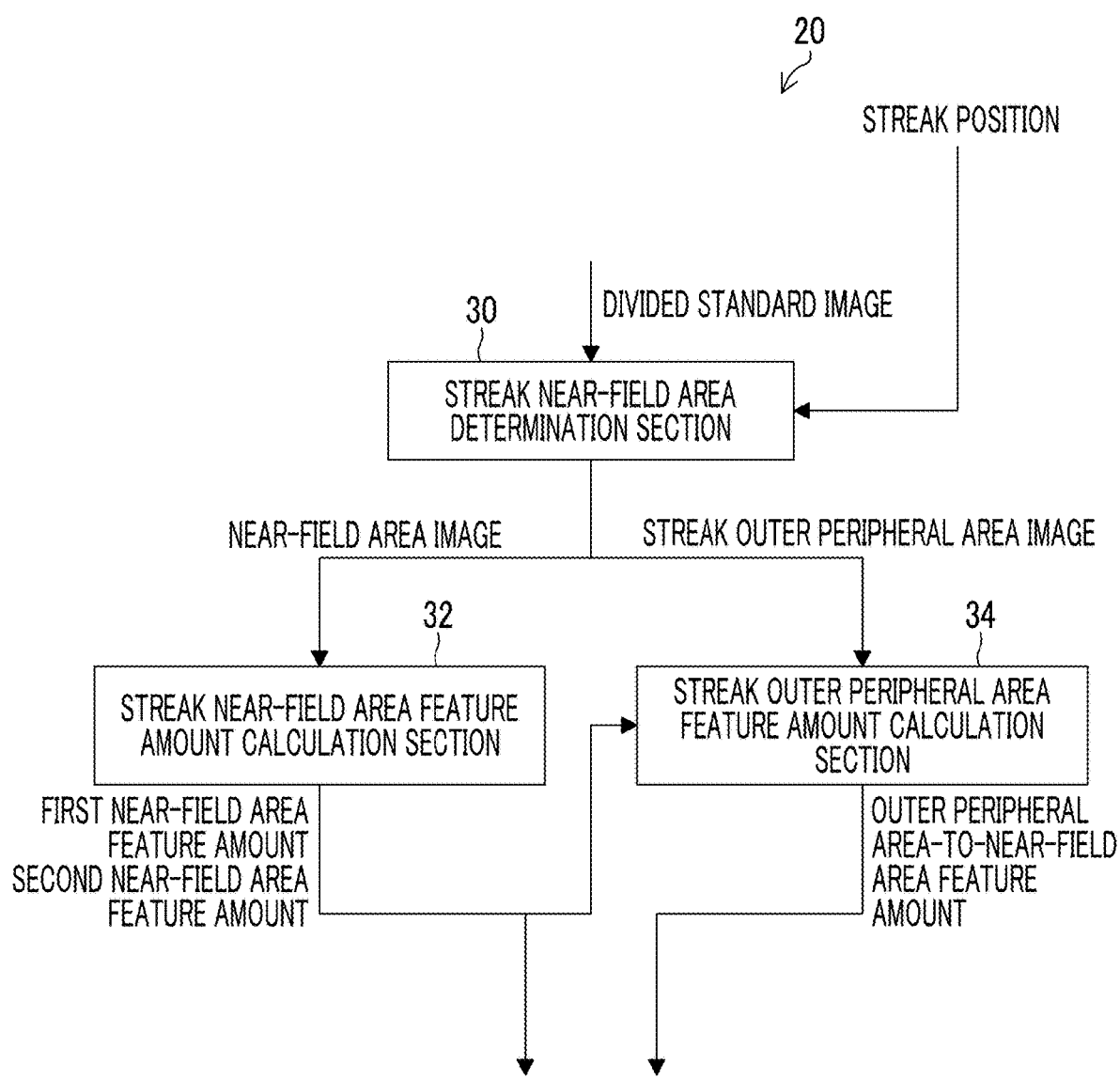
FIG. 8 is a block diagram showing an example of a configuration of an image feature amount calculation section.

FIG. 8 is a block diagram showing an example of a configuration of the image feature amount calculation section 20. As shown in the figure, the image feature amount calculation section 20 includes a streak near-field area determination section 30, a streak near-field area feature amount calculation section 32, and a streak outer peripheral area feature amount calculation section 34.

The streak near-field area determination section 30 (an example of a streak near-field area specification section and an example of an outer peripheral area specification section) specifies an area that is continuous from an area of the streak detected by the basic streak intensity calculation section 18, in which a variation of image feature amounts is within a predetermined first range, as a streak near-field area, with respect to the divided standard images acquired from the image registration section 14. Further, the streak near-field area determination section 30 specifies an area that is in contact with the streak near-field area as a streak outer peripheral area.

The streak near-field area feature amount calculation section 32 (an example of a streak near-field area information acquisition section) acquires color information on the streak near-field area determined in the streak near-field area determination section 30 as a first near-field area feature amount, and specifies frequency feature information on the streak near-field area as a second near-field area feature amount.

The streak outer peripheral area feature amount calculation section 34 (an example of an outer peripheral area information acquisition section) performs a filtering process with respect to the streak outer peripheral area determined in the streak near-field area determination section 30, and acquires frequency feature information for each combination of a direction and a frequency band as an outer peripheral area feature amount. Further, the streak outer peripheral area feature amount calculation section 34 acquires a ratio between the outer peripheral area feature amount and the second near-field area feature amount acquired from the streak near-field area feature amount calculation section 32 for each combination of the direction and the frequency band as an outer peripheral area-to-near-field area feature amount.

Figure 9:
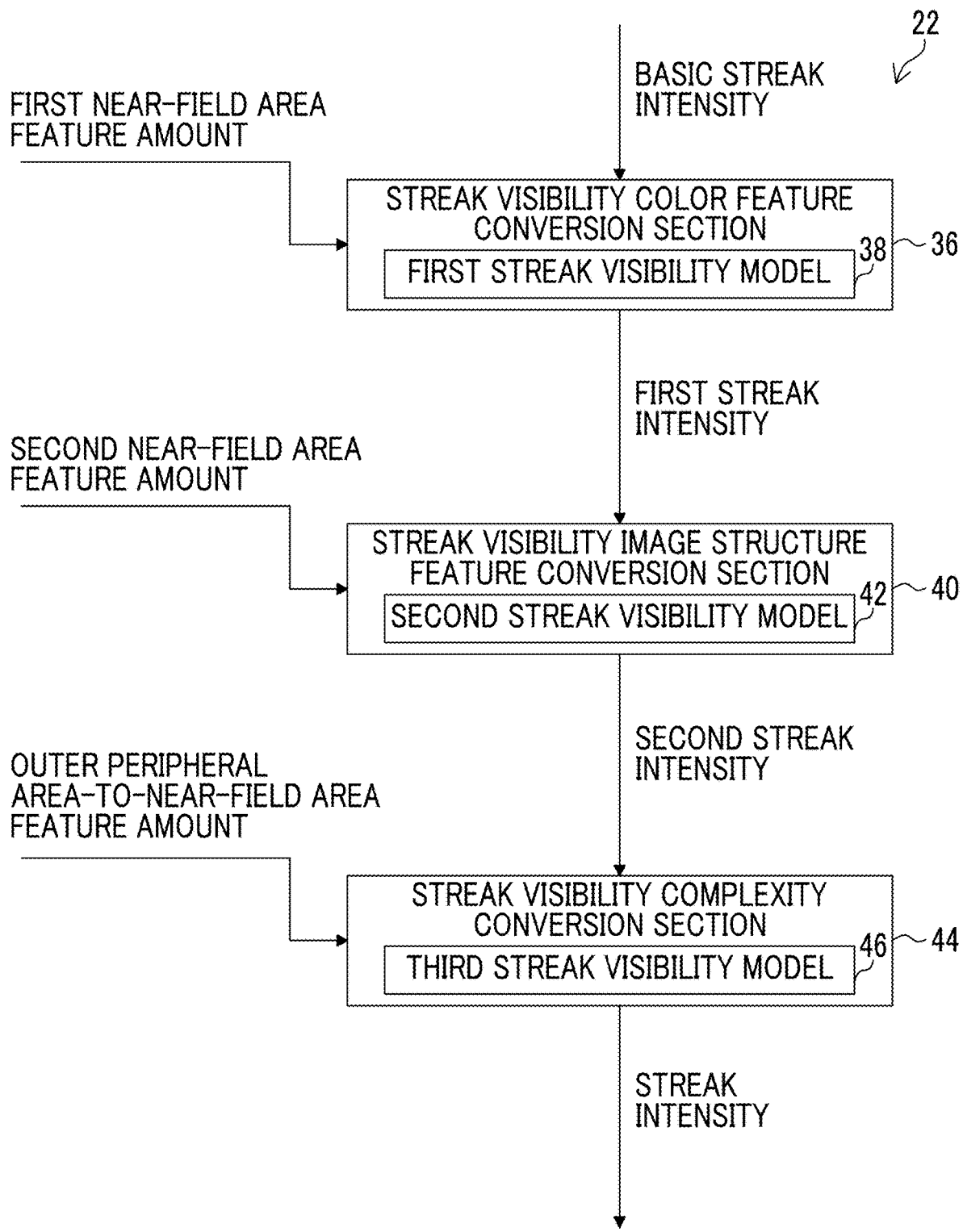
FIG. 9 is a block diagram showing an example of a configuration of a streak visibility conversion section.

FIG. 9 is a block diagram showing an example of a configuration of the streak visibility conversion section 22. As shown in the figure, the streak visibility conversion section 22 includes a streak visibility color feature conversion section 36, a streak visibility image structure feature conversion section 40, and a streak visibility complexity conversion section 44.

The streak visibility color feature conversion section 36 converts the basic streak intensity acquired from the basic streak intensity calculation section 18 into a first streak intensity (an example of a first streak sensory evaluation value) on the basis of the first near-field area feature amount acquired from the streak near-field area feature amount calculation section 32 of the image feature amount calculation section 20 and a first streak visibility model (an example of a first streak model) that is stored in advance in a storage section 38 that is provided in the streak visibility color feature conversion section 36. The first streak visibility model is a multivariate analysis model obtained from a sensory evaluation test through visual observation of a human, in which the basic streak intensity is set as an input variable and the first streak intensity is set as an output value.

The streak visibility image structure feature conversion section 40 converts the first streak intensity acquired from the streak visibility color feature conversion section 36 into a second streak intensity (an example of a second streak sensory evaluation value) on the basis of the second near-field area feature amount acquired from the streak near-field area feature amount calculation section 32 and a second streak visibility model (an example of a second streak model) that is stored in advance in a storage section 42 that is provided in the streak visibility image structure feature conversion section 40. The second streak visibility model is a multivariate analysis model obtained from a sensory evaluation test through visual observation of a human, in which the first streak intensity is set as an input variable and the second streak intensity is set as an output value.

The streak visibility complexity conversion section 44 converts the second streak intensity acquired from the streak visibility image structure feature conversion section 40 into a third streak intensity (an example of a third streak sensory evaluation value) on the basis of the outer peripheral area feature amount acquired from the streak outer peripheral area feature amount calculation section 34 and a third streak visibility model (an example of a third streak model) that is stored in advance in a storage section 46 that is provided in the streak visibility complexity conversion section 44. The third streak visibility model is a multivariate analysis model obtained from a sensory evaluation test through visual observation of a human, in which the second streak intensity is set as an input variable and the final streak intensity is set as an output value.

[Method for Creating Streak Visibility Model]

A method for creating the first streak visibility model will be described. The first streak visibility model is created by a sensory evaluation test.

Figure 10:
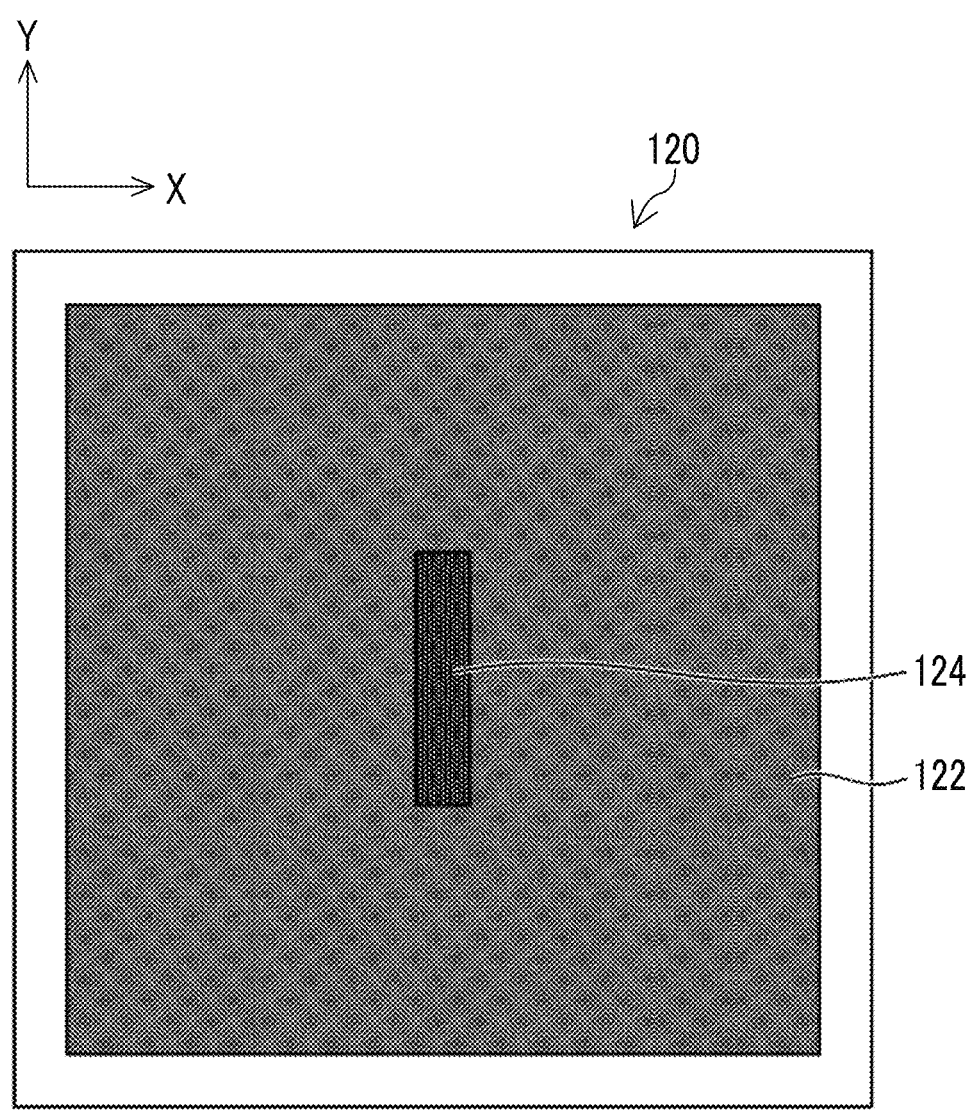
FIG. 10 is a diagram showing a sensory evaluation sample.

FIG. 10 is a diagram showing a sensory evaluation sample 120 used for the sensory evaluation test. The sensory evaluation sample 120 is obtained by generating and printing a streak 124 having a predetermined length at a central portion of a rectangular background image 122 having a predetermined size in the X-direction in a pseudo manner. In the example shown in FIG. 10, the streak 124 has a width corresponding to one pixel in the X-direction, and extends in the Y-direction.

Figure 11:
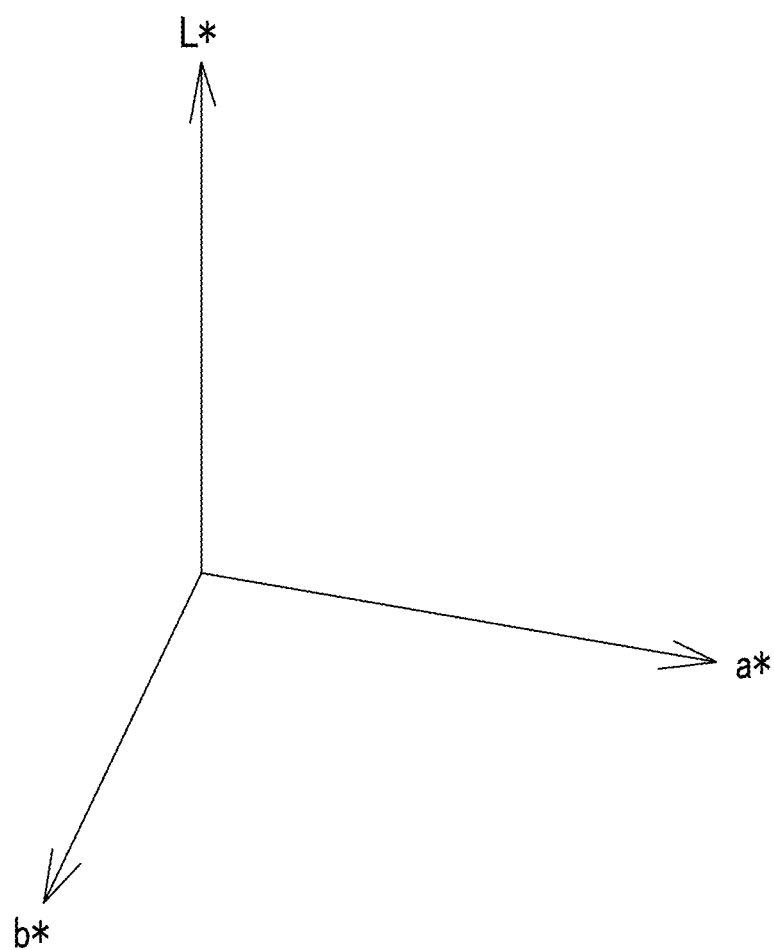
FIG. 11 is a diagram showing an image space of a first streak visibility model.

The sensory evaluation test sets a brightness, a saturation, and a hue of the background image 122 of the sensory evaluation sample 120, and an intensity of the streak 124 as parameters. For example, a color of the background image 122 may include gray, red, green, blue, cyan, magenta, and yellow. An image space of the background image 122 is shown in FIG. 11. As shown in the figure, the background image 122 may be expressed as a Lab color space that is a color space of a device-independent L*a*b* color system.

Further, the intensity of the streak 124 may be changed by the color or thickness of the streak 124.

A tester observes the sensory evaluation sample 120 under a predetermined environment, and digitizes a visually recognized streak intensity. Specifically, the visually recognized streak intensity is digitized in 5-stage evaluations. Preferably, the tester prepares a reference streak sample that is digitized in 5 stages, compares the sensory evaluation sample 120 with a reference streak sample in a certain stage that is visually similar thereto, and performs the digitization in consideration of the comparison result.

The first streak visibility model is created from the result of the sensory evaluation test. Specifically, the color of the background image 122 is calculated by setting component values of L, a, and b of the Lab color space as L1, a, and b, and a relationship between digitized 5-stage sensory evaluation values (S) and intensities (PS) of the streaks 124 is modeled using a multivariate analysis model. That is, the first streak visibility model is expressed as the following expression 1 using a model formula F1.

$$S=F1(L1,a,b,PS) \qquad \text{(Expression 1)}$$

The first streak visibility model created in this way is stored in the storage section 38.

Next, a sensory evaluation test for creating the second streak visibility model will be described.

Figure 12:
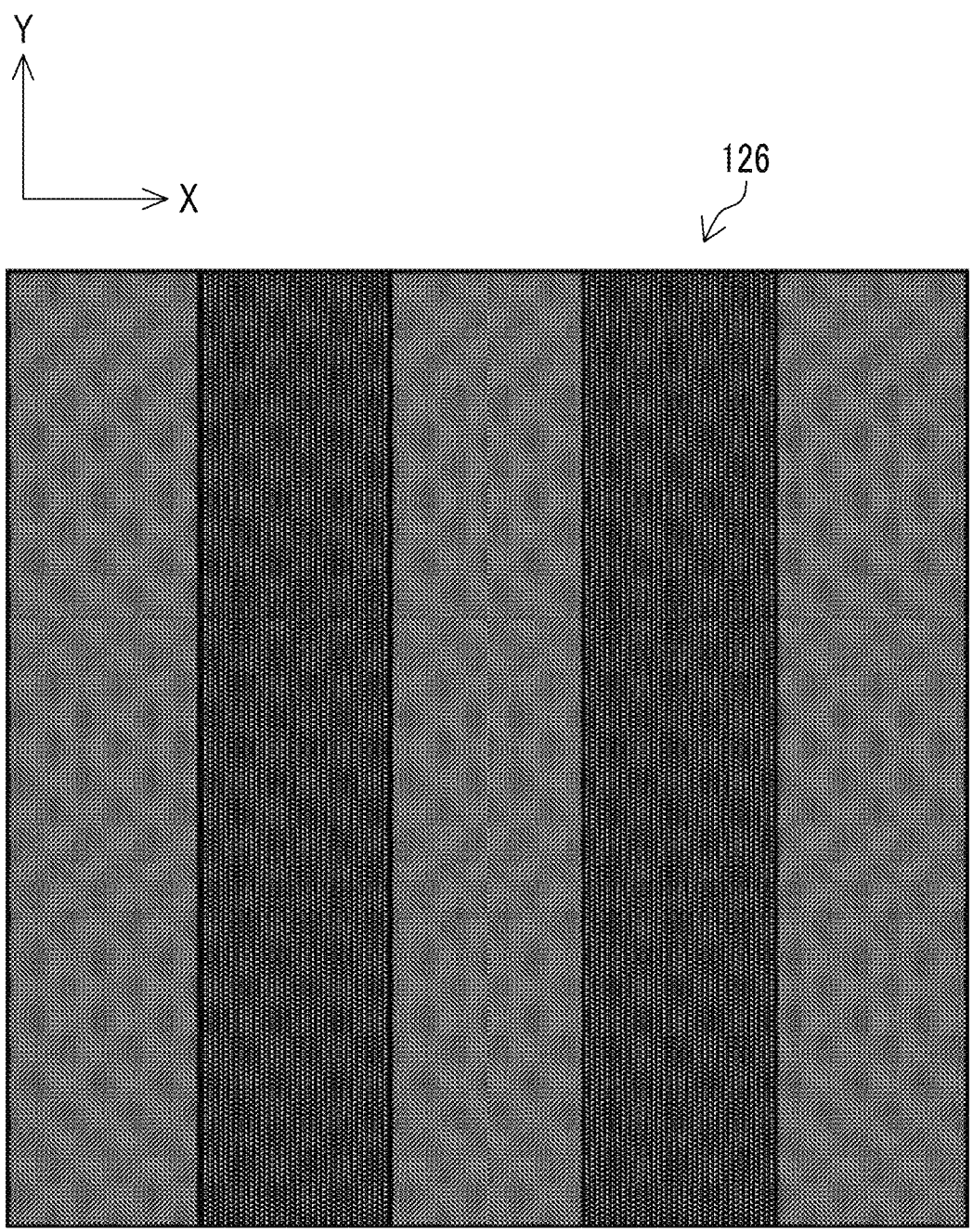
FIG. 12 is a diagram showing an example of a background image.

FIG. 12 is a diagram showing an example of a background image 126 of a sensory evaluation sample used for a sensory evaluation test for creating the second streak visibility model. In the background image 126, belt-like areas that have a predetermined width in a first direction and extend in a second direction orthogonal to the first direction, in which the belt-like areas are two gray areas having different brightnesses, are alternately arranged. In the example shown in FIG. 12, the first direction is the X-direction and the second direction is the Y-direction.

Figure 13:
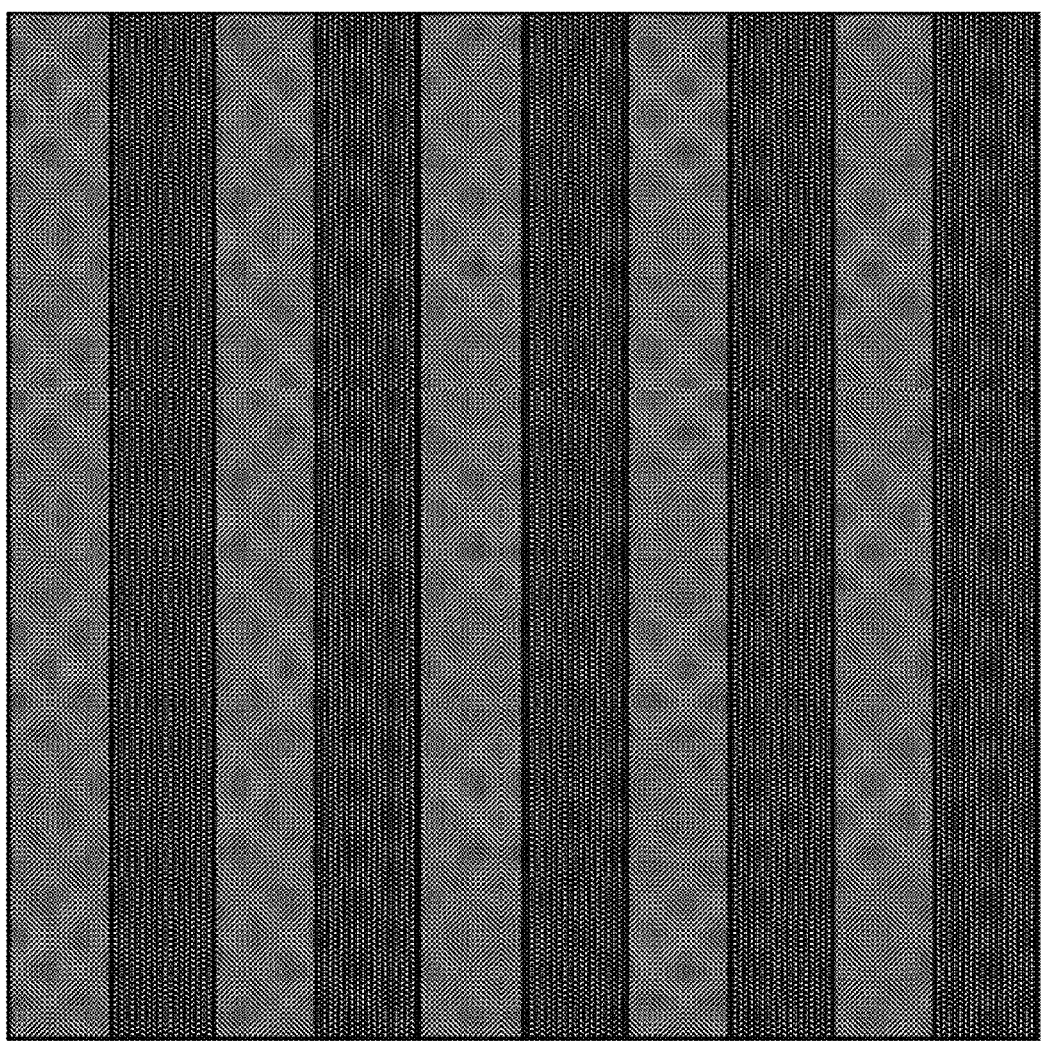
FIG. 13 is a diagram showing an example of a background image.

The sensory evaluation test sets an average brightness, a frequency, and a contrast of the background image 126, and an intensity of a streak that is generated in the background image 126 in a pseudo manner as parameters. FIG. 13 is a diagram showing a background image 126 different from the background image 126 shown in FIG. 12. These two different background images 126 are formed so that the brightnesses of the two gray areas that are alternately arranged are the same but the widths of the belt-like areas in the X-direction are different from each other. That is, the frequencies are different from each other.

Figure 14:
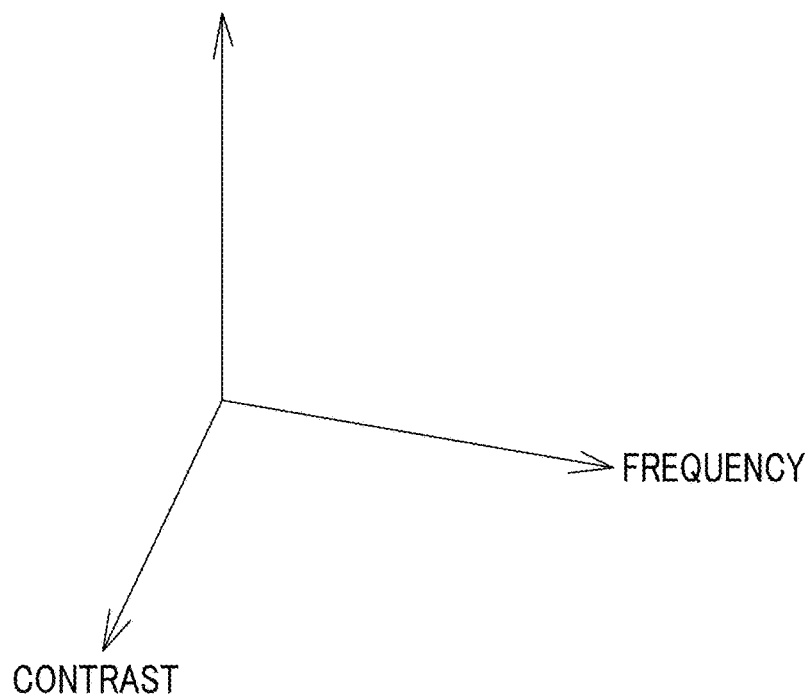
FIG. 14 is a diagram showing an image space of a second streak visibility model.

An image space of the background image 126 is shown in FIG. 14. As shown in the figure, the background image 126 may be expressed as a space including an average brightness, a frequency, and a contrast.

A tester observes a sensory evaluation sample using such a background image 126 in a similar way to the case of the first streak visibility model, and digitizes a visually recognized streak intensity in 5-stage evaluations.

The second streak visibility model is created from the result of the sensory evaluation test. Specifically, a power (contrast) of a frequency component of the background image 126 and an average brightness are calculated as feature amounts (fqa1, fqa2, . . . , fqan, L2) where n is a natural number, and a relationship between the digitized 5-stage sensory evaluation values (S) and intensities (PS) of streaks that are generated in a pseudo manner is modeled using the multivariate analysis. That is, the second streak visibility model is expressed as the following expression 2 using a model formula F2.

$$S=F2(fqa1, fqa2, \ldots, fqan, L2, PS) \quad \text{(Expression 2)}$$

The power of the frequency component may be calculated using a filter that extracts a direction, a frequency feature, and the like, corresponding to a visual feature, such as a Gabor filter. For example, powers of frequency components of n=12 formed by combinations of four directions of 0°, 45°, 90°, and 135° and three frequency features of a low frequency, a medium frequency, and a high frequency may be calculated.

Here, each directional component is extracted through a filtering process using the background image 126 having belt-like areas that extend in the Y-direction (0°) that is the same direction as a direction of a streak. Since contribution in the same direction as the direction of the streak is the largest, validity is secured only using the background image 126 in this direction, but each directional component may be extracted through a sensory evaluation test using background images having belt-like areas that extend in the X-direction (90°) or in oblique directions (45° and 135°).

The second streak visibility model created in this way is stored in the storage section 42.

Finally, a sensory evaluation test for creating the third streak visibility model will be described.

Figure 15:
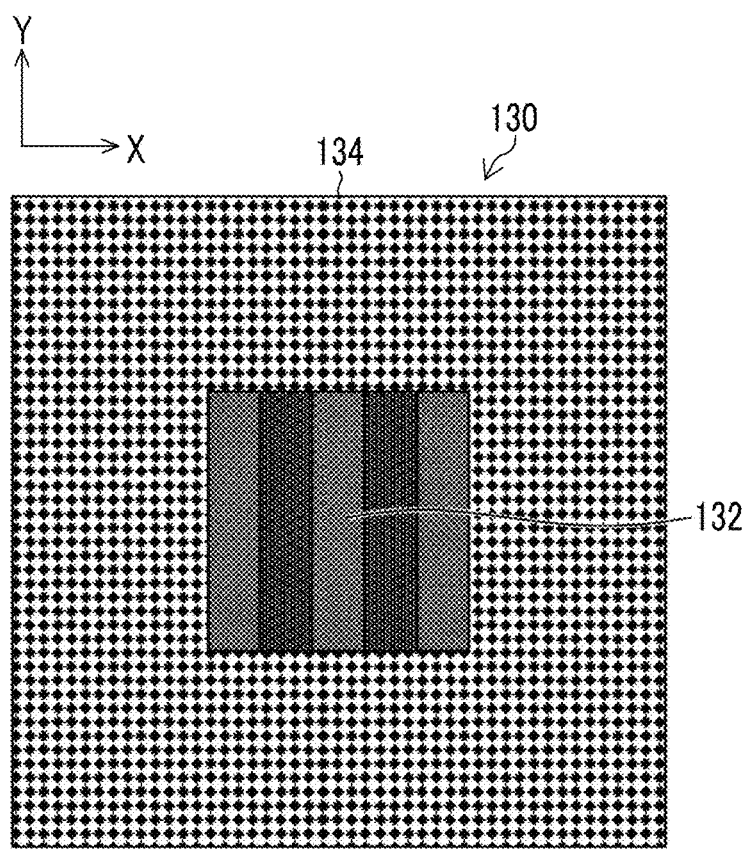
FIG. 15 is a diagram showing an example of a background image.

FIG. 15 is a diagram showing an example of a background image 130 of a sensory evaluation sample used for a sensory evaluation test for creating the third streak visibility model. The background image 130 includes a pseudo near-field area 132 that is disposed at the center of the background image 130 and a pseudo outer peripheral area 134 that is an area outside the pseudo near-field area 132.

In the pseudo near-field area 132, belt-like areas that have a predetermined width in a first direction and extend in a second direction orthogonal to the first direction, in which the belt-like areas are two gray areas having different brightnesses, are alternately arranged. In the example shown in FIG. 15, the first direction is the X-direction and the second direction is the Y-direction, each of which has a predetermined size of 1 mm×1 mm or more. Further, the pseudo outer peripheral area 134 has a white-gray checkered pattern.

Figure 16:
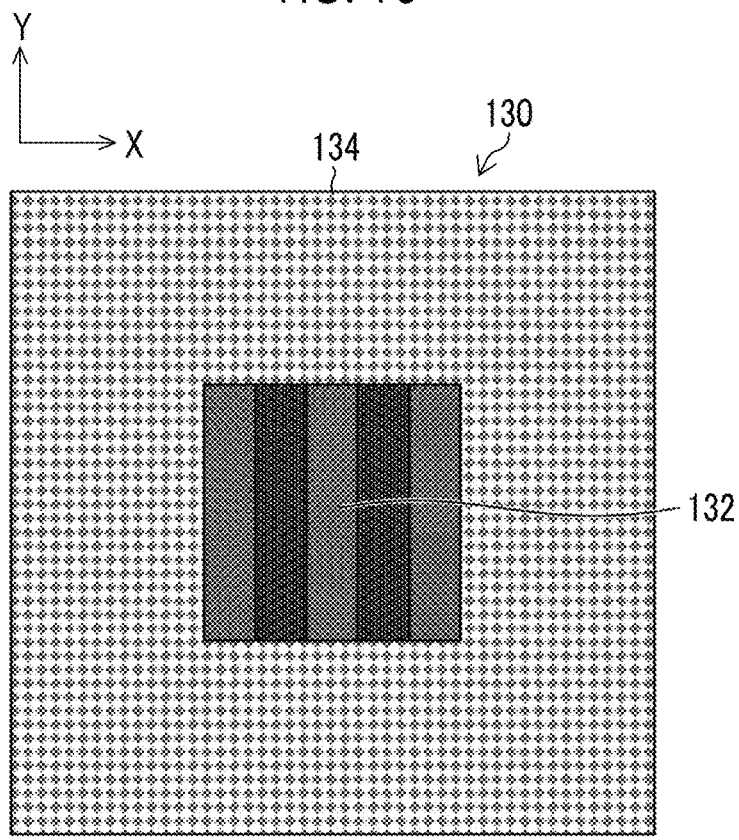
FIG. 16 is a diagram showing an example of a background image.

The sensory evaluation test sets a contrast of the pseudo near-field area 132, a frequency of the pseudo near-field area 132, a background interference component contrast that is a contrast of the pseudo outer peripheral area 134, and an intensity of a streak that is generated in the background image 130 as parameters. FIG. 16 is a diagram showing a background image 130 different from the background image 130 shown in FIG. 15. The background image 130 shown in FIG. 16 is configured so that a concentration of gray of a checkered pattern of a pseudo outer peripheral area 134 is different from that of the background image 130 shown in FIG. 15. That is, a background interference component contrast is different from that of the background image 130 shown in FIG. 15. A frequency of the pseudo outer peripheral area 134 may be set as a parameter.

Figure 17:
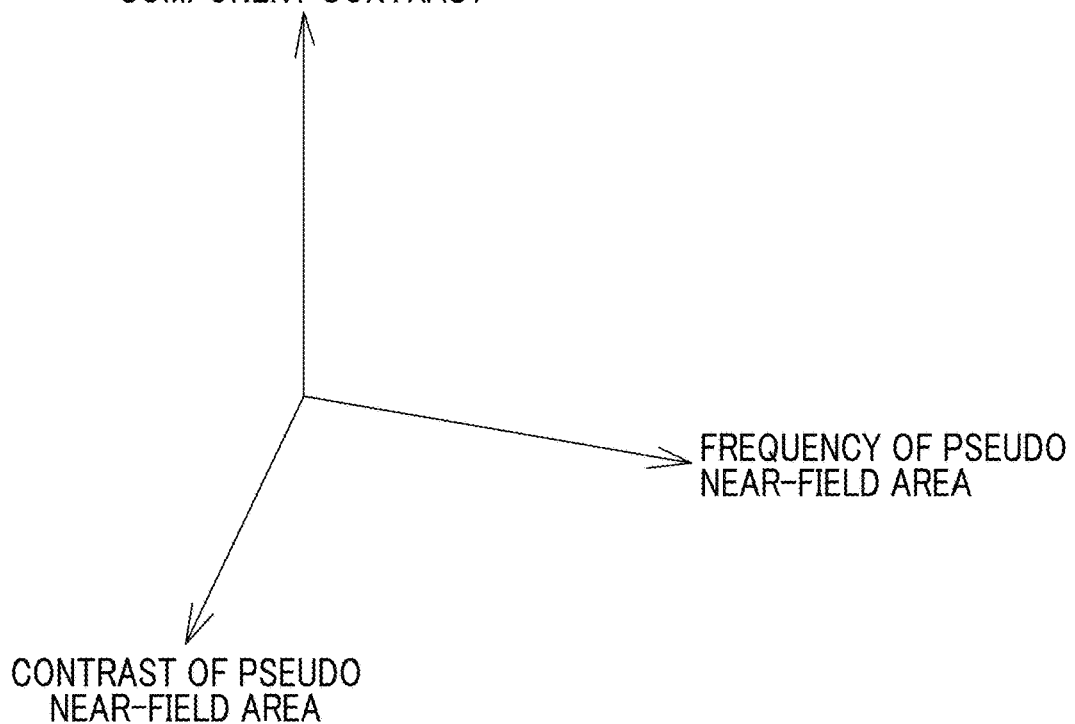
FIG. 17 is a diagram showing an image space of a third streak visibility model.

Further, the image space of the background image 130 is shown in FIG. 17. As shown in the figure, the background image 130 may be expressed as a space including the contrast of the pseudo near-field area 132, the frequency of the pseudo near-field area 132, and the background interference component contrast of the pseudo outer peripheral area 134.

A tester observes a sensory evaluation sample using the background image 130 in a similar way to the case of the first streak visibility model, and digitizes a visually recognized streak intensity in 5-stage evaluations.

The third streak visibility model is created from the result of the sensory evaluation test. Specifically, a frequency component of the pseudo near-field area 132 in the background image 130 and the background interference component contrast of the pseudo outer peripheral area 134 are calculated as feature amounts (fqb1, fqb2, . . . , fqbn, C) where n is a natural number, and a relationship between the digitized 5-stage sensory evaluation values (S) and intensities (PS) of streaks that are generated in a pseudo manner is modeled using the multivariate analysis. That is, the third streak visibility model is expressed as the following expression 3 using a model formula F3.

$$S=F3(fqb1, fqb2, \ldots, fqbn, C, PS) \quad \text{(Expression 3)}$$

Similar to the case of the second streak visibility model, the frequency component may be calculated using a filter that extracts directions (0°, 45°, 90°, and 135°) and frequency features (a low frequency, a medium frequency, and a high frequency) corresponding to a visual feature, such as a Gabor filter, where n represents the number of combinations thereof. Each directional component may be extracted by performing a sensory evaluation test using a pseudo near-field area having belt-like areas that extend in the X-direction (90°) or the oblique directions (45° and 135°).

The third streak visibility model created in this way is stored in the storage section 46.

[Printed Matter Inspection Method]

Figure 18:
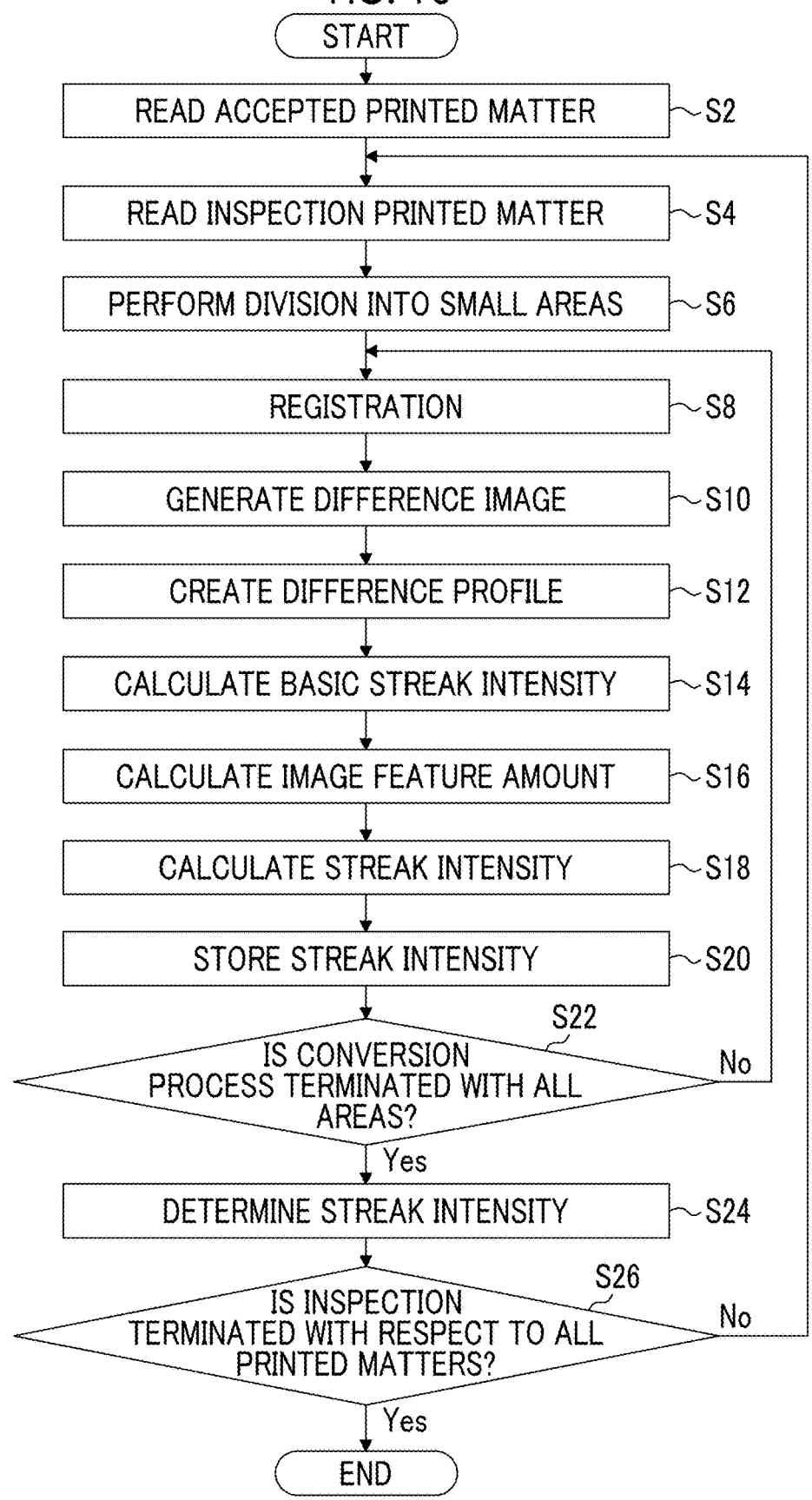
FIG. 18 is a flowchart showing an example of processes of a printed matter inspection method.

FIG. 18 is a flowchart showing an example of processes of the printed matter inspection method according to the first embodiment.

First, an accepted printed matter for a reference of inspection of a printed matter is prepared. The image acquisition section 50 reads the accepted printed matter, and generates a standard image, in step S2. The generated standard image is input to the printed matter inspection device 10, and is stored in a storage section (not shown) of the image division section 12.

Then, the image acquisition section 50 reads an inspection printed matter, and generates an inspection image, in step S4. The generated inspection image is input to the image division section 12. The standard image and the inspection image are not limited to output data of the image acquisition section 50, and may be data obtained by performing image processing such as resolution conversion with respect to the output data of the image acquisition section 50.

Then, in step S6, the image division section 12 performs registration of the standard image generated in step S2 and the inspection image generated in step S4, divides the inspection image after the registration into a plurality of divided inspection images of a predetermined size, and divides the standard image into a plurality of divided standard images at the same positions.

Then, the image registration section 14 selects one divided inspection image from the plurality of divided inspection images, in step S8, and performs a detailed registration process between the selected divided inspection image and a divided standard image at a position corresponding to a position of the divided inspection image.

Figure 19:
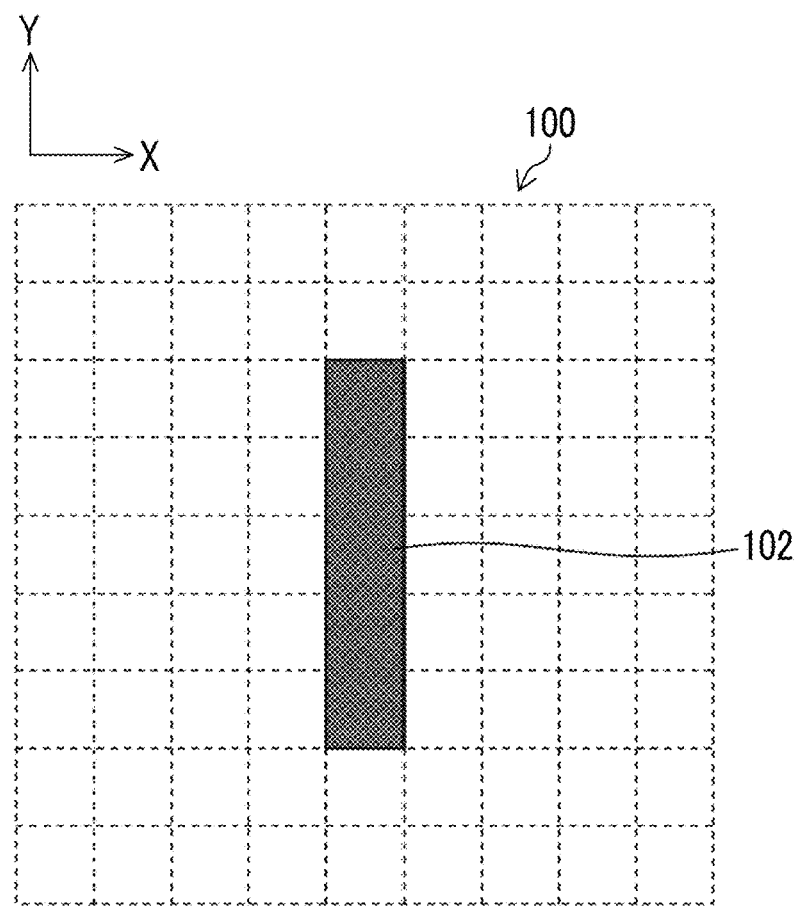
FIG. 19 is a diagram showing an example of a difference image.

After the detailed registration process is terminated, the difference calculation section 16 generates a difference image from the selected divided inspection image and the corresponding divided standard image, in step S10. In a case where the divided inspection image is printed in a similar way to the divided standard image, each pixel value of the difference image becomes 0. In a case where a defect is present in the divided inspection image, a pixel value of a portion of the defect in the difference image becomes a value that is not 0. FIG. 19 is a diagram showing an example of a difference image 100. In the difference image 100, a streaky image defect 102 that has a pixel value that is not 0 and extends in the Y-direction is identified.

Subsequently, the difference calculation section 16 performs integration with respect to the difference image in a predetermined direction to create a difference profile for each of R, G, and B, in step S12. For example, in the case of a printed matter in a single pulse-type inkjet print device, a streak that is an image defect extends along a transport direction of a recording medium. In this case, the difference calculation section 16 may perform the integration with respect to the difference image in the transport direction of the recording medium.

Figure 20:
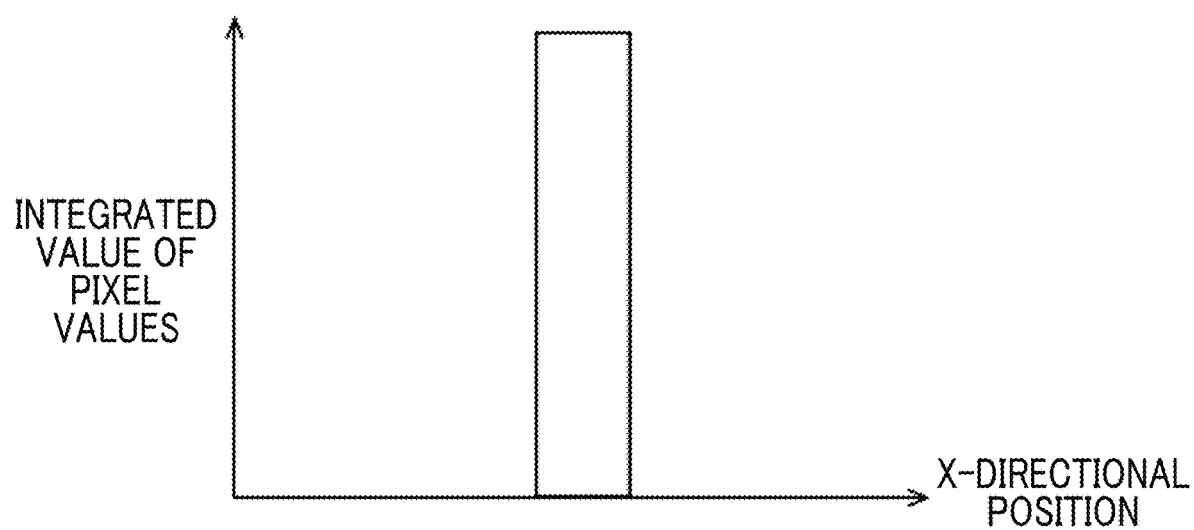
FIG. 20 is a diagram showing a difference profile of R created from the difference image shown in FIG. 19.

FIG. 20 is a diagram showing a difference profile of R created by performing integration with respect to the difference image shown in FIG. 19 in the Y-direction. As shown in the figure, in the difference profile, an integrated value of pixel values shows a high value at an X-directional position of the image defect 102.

Then, in step S14 (an example of a detection step and an example of an intensity calculation step), the basic streak intensity calculation section 18 detects a streak from the difference profile calculated in step S12, and calculates a basic streak intensity of the detected streak.

In the calculation of the basic streak intensity, first, difference profiles for the respective R, G, and B created in step S12 are converted into values in the XYZ color space.

Then, the converted values in the XYZ color space are converted into values in an opposite color space of three axes of white/black (W/K), red/green (R/G), and blue/yellow (B/Y).

Subsequently, the respective values in the opposite color space are subjected to two-dimensional Fourier transform, and a power spectrum of the Fourier transform result is calculated. Further, with respect to the calculated power spectrum, filtering correction is performed according to two-dimensional space frequency features adapted for a human's visual feature.

Further, inverse Fourier transform is performed with respect to the values after the filtering correction to calculate values in the XYZ color space with respect to (W/K, R/G, and B/Y) in the opposite color space. In this way, a value obtained by modulating a streak based on a visual feature is set as the basic streak intensity.

In this way, the basic streak intensity is a value obtained by converting a value of read-out data of the RGB color space into a value of the XYZ color space, converting the value converted into the XYZ color space into a value of an opposite color space, performing two-dimensional Fourier transform with respect to the respective values of the opposite color space, calculating a power spectrum of the Fourier transform result, performing filtering correction with respect to the calculated power spectrum, and performing inverse Fourier transform with respect to a value after the filtering correction. With respect to the calculation of the basic streak intensity, refer to JP2007-172512A.

After the basic streak intensity is calculated in step S14, the image feature amount calculation section 20 calculates an image feature amount of a divided standard image at a position of the streak detected by the basic streak intensity calculation section 18, in step S16.

Figure 21:
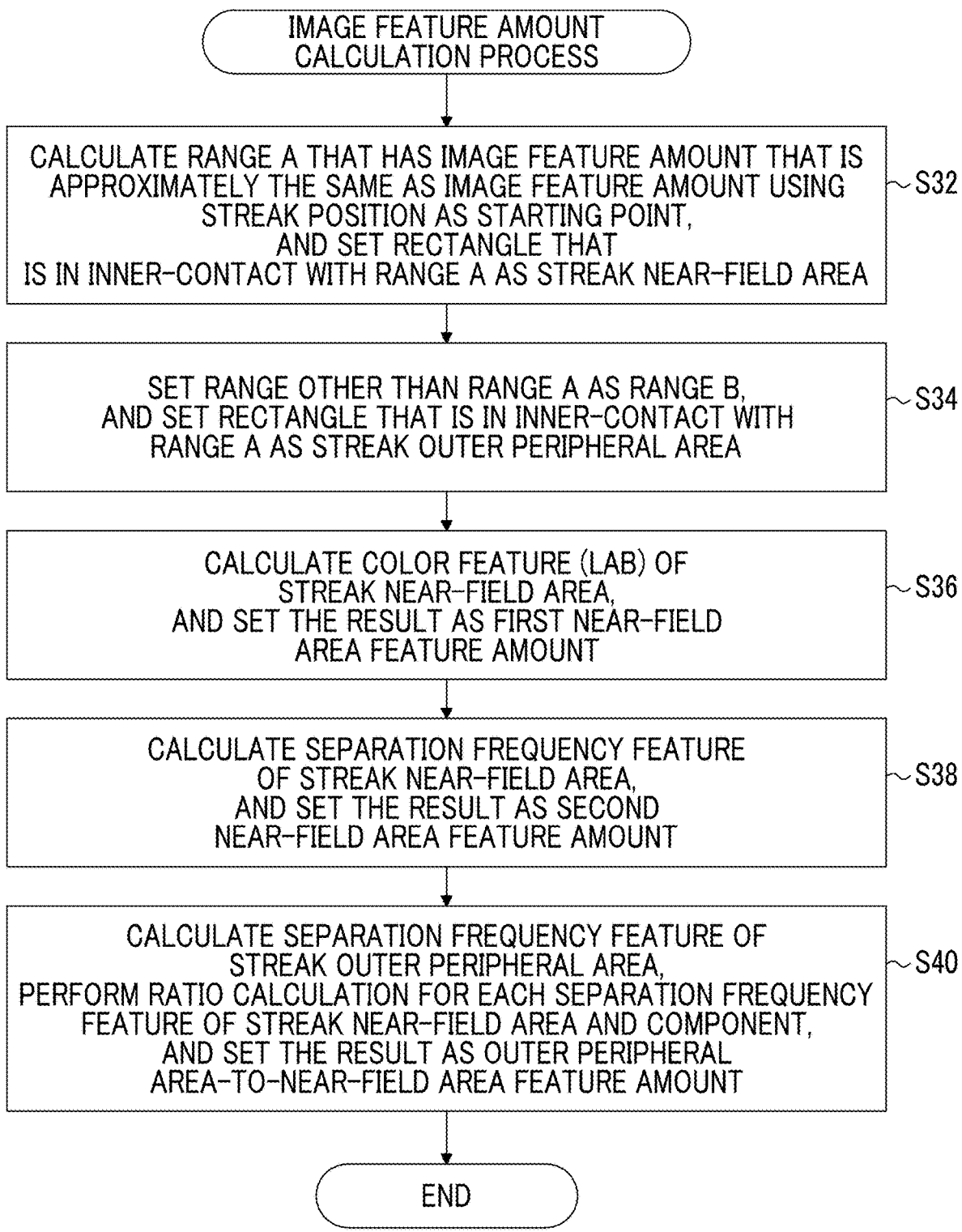
FIG. 21 is a flowchart showing an example of an image feature amount calculation process.

FIG. 21 is a flowchart showing details of the image feature amount calculation process in step S16.

First, the streak near-field area determination section 30 specifies a streak near-field area, in step S32 (an example of a streak near-field area specification step). Here, using a streak position in a difference image as a starting point, a range A that has an image feature amount that is approximately the same as an image feature amount of a starting point in a divided standard image is calculated, and a rectangular region that is in inner-contact with the range A including the starting point is set as a streak near-field area of the divided standard image. Here, as the image feature amount, a variance value of pixel values is used. The image feature amount may employ a value relating to the variance value of the pixel values, such as a standard deviation of the pixel values.

Subsequently, the streak near-field area determination section 30 specifies a streak outer peripheral area, in step S34 (an example of an outer peripheral area specification step). Here, a range outside the range A calculated in step S32 is set as a range B, and an area obtained by excluding the streak near-field area from a rectangular area that is in inner-contact with the range B is set as a streak outer peripheral area of the divided standard image. The streak near-field area determination section 30 may set an entirety of the range B outside the range A as the streak outer peripheral area, and may set an area of a predetermined first size outside the range A as the streak outer peripheral area. Further, an area in which a variation of image feature amounts is within a predetermined second range may be set as a streak outer peripheral area. The streak outer peripheral area is not limited to a form that surrounds the streak near-field area, and may be in contact with a part of the streak near-field area.

Then, the streak near-field area feature amount calculation section 32 calculates a color feature of the streak near-field area of the divided standard image, in step S36 (an example of a streak near-field area information acquisition step), and sets the color feature as a first near-field area feature amount. Here, the streak near-field area feature amount calculation section 32 performs a color conversion process from the RGB color space to the Lab color space with respect to the streak near-field area, and acquires information on a brightness, a saturation, and a hue of the streak near-field area as the first near-field area feature amount.

Subsequently, the streak near-field area feature amount calculation section 32 calculates a resolution frequency feature of the streak near-field area of the divided standard image (an example of frequency feature information on the streak near-field area), in step S38 (an example of a streak near-field area information acquisition step), and sets the result as a second near-field area feature amount. Here, the streak near-field area feature amount calculation section 32 performs a filtering process with respect to the streak near-field area of the divided standard image using a frequency resolution filter prepared for each direction, and acquires frequency feature information for each combination of a direction and a frequency band as the second near-field area feature amount.

Finally, the streak outer peripheral area feature amount calculation section 34 acquires an outer peripheral area-to-near-field area feature amount in step S40 (an example of an outer peripheral area information acquisition step). Here, the streak outer peripheral area feature amount calculation section 34 performs filter processing with respect to the streak outer peripheral area of the divided standard image using a frequency separation filter prepared in each direction, and acquires frequency feature information for each combination of a direction and a frequency band as the outer peripheral area feature amount. Further, the streak outer peripheral area feature amount calculation section 34 calculates a ratio between the outer peripheral area feature amount and the second near-field area feature amount acquired in step S38 for each component, and acquires the result as an outer peripheral area-to-near-field area feature amount.

The streak near-field area and the streak outer peripheral area may be determined as follows.

Figure 22:
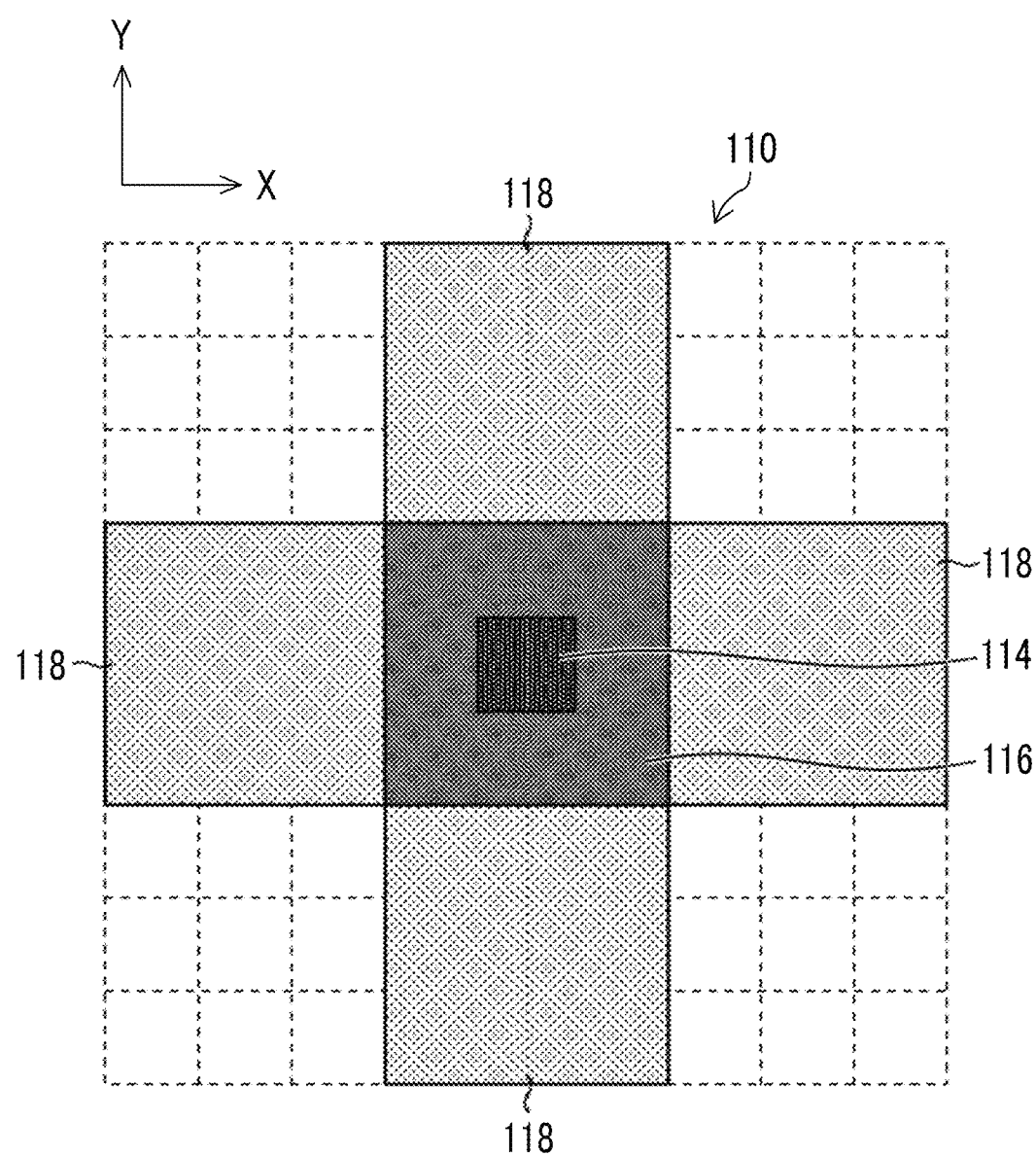
FIG. 22 is a diagram showing a streak position of a divided inspection image, an initial streak near-field area, and contiguous areas.

FIG. 22 is a diagram showing an initial streak near-field area 116 in a case where a streak position 114 of a divided standard image 110 is set as a starting point, and a contiguous area 118 that is contiguous to the streak near-field area 116.

As shown in FIG. 22, a surrounding area of the streak position 114, including the streak position 114, is set as the initial streak near-field area 116. Here, the initial streak near-field area 116 is an area in a range of 3 pixels in the X-direction×3 pixels in the Y-direction. A variance value of pixel values of the initial streak near-field area 116 is calculated.

Subsequently, a variance value of pixel values of each of four contiguous areas 118 that are contiguous to the initial streak near-field area 116 is calculated. Further, in a case where a difference between the variance value of the pixel values of the contiguous area 118 and the variance value of the pixel values of the initial streak near-field area 116 is equal to or smaller than a threshold value, the contiguous area 118 is added to the initial streak near-field area 116.

Sequentially, a variance value of pixel values is calculated with respect to an area contiguous to the near-field area, and a difference between the variance value of the pixel values of the area contiguous to the near-field area and the variance value of the initial streak near-field area 116 is calculated, and an area of which the difference is equal to or smaller than a threshold value is added to the near-field area. In a case where determination of the contiguous area is completely terminated, a contiguous area determination process is terminated. With respect to an area for which the determination process is performed once, a second determination process is not performed.

In this way, an area contiguous to the initial streak near-field area 116, which is an area of which a difference between variance values of pixel values is equal to or smaller than a threshold value is set as a near-field area. An area outside the streak near-field area determined in this way is set as a streak outer peripheral area.

Here, the variance value of the pixel values of the initial streak near-field area 116 is compared with the variance value of the pixel values of the contiguous area, but a variance value of pixel values of a near-field area after the contiguous area is added may be recalculated, and a difference value therebetween may be determined using the recalculated variance value of the near-field area and a variance value of a contiguous area for which determination is to be performed.

Returning to the description of FIG. 18, after the image feature amount is calculated in step S16, the streak visibility conversion section 22 performs streak visibility conversion on the basis of the basic streak intensity and the image feature amount in step S18 (an example of the visibility determination step) to calculate a streak intensity.

Figure 23:
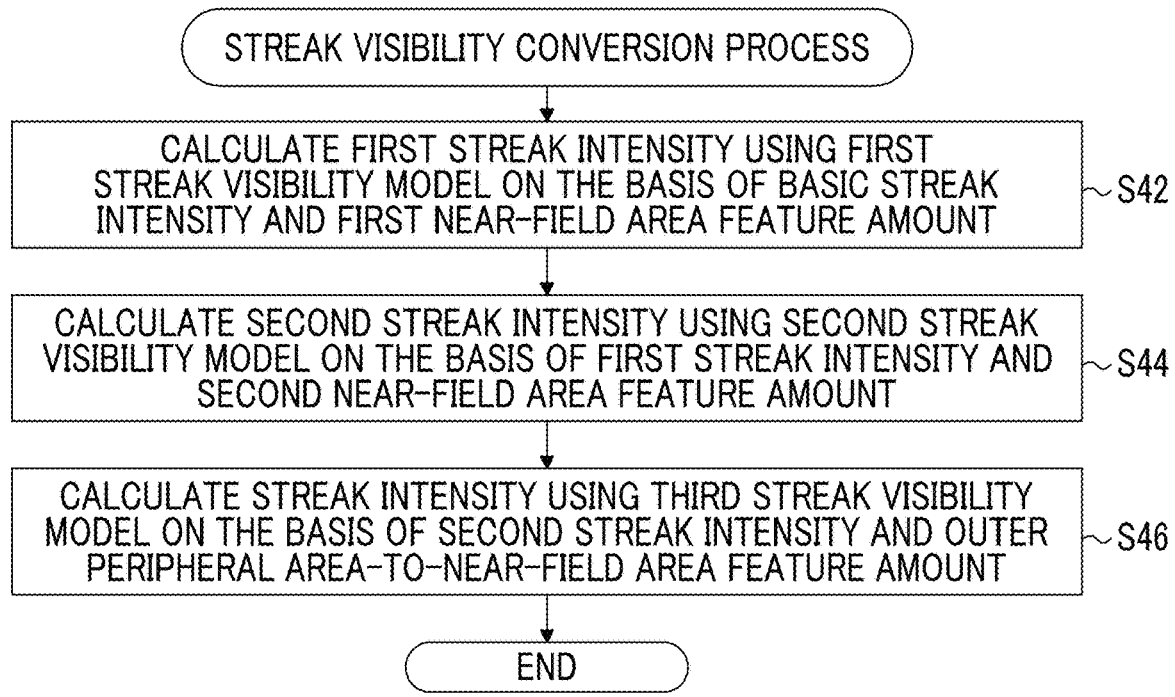
FIG. 23 is a flowchart showing an example of a streak visibility conversion process.

The streak visibility conversion process in step S18 will be described in detail. FIG. 23 is a flowchart showing details of the streak visibility conversion process.

First, the streak visibility color feature conversion section 36 calculates a first streak intensity using the first streak visibility model on the basis of the basic streak intensity acquired in step S14 and the first near-field area feature amount acquired in step S36, in step S42.

Then, the streak visibility image structure feature conversion section 40 calculates a second streak intensity using the second streak visibility model on the basis of the first streak intensity acquired in step S42 and the second near-field area feature amount acquired in step S38, in step S44.

Finally, the streak visibility complexity conversion section 44 calculates a final streak intensity using the third streak visibility model on the basis of the second streak intensity acquired in step S44 and the outer peripheral area-to-near-field area feature amount acquired in step S40, in step S46.

In the streak visibility conversion process according to this embodiment, a process of converting the basic streak intensity into the first streak intensity, a process of converting the first streak intensity into the second streak intensity, and a process of converting the second streak intensity to the final streak intensity are performed in stages, but it is sufficient if the final streak intensity can be calculated using the basic streak intensity, the first near-field area feature amount, the second near-field area feature amount, and the outer peripheral area-to-near-field area feature amount, and it is not essential to calculate the first streak intensity and/or the second streak intensity.

Returning to the description of FIG. 18, after the streak visibility conversion process is performed in step S18, the streak visibility conversion section 22 stores the streak intensity calculated in step S18, in step S20.

Then, the streak visibility conversion section 22 determines whether the streak visibility conversion process is performed with respect to all the divided standard images, in step S22. In a case where the divided standard image is present, the procedure proceeds to step S8, and the same processes are repeated. In a case where the streak visibility conversion process is terminated with respect to all the divided standard images, the procedure proceeds to step S24.

In step S24 (an example of a determination step), the determination section 24 determines the streak intensity of the entire streak on the basis of the streak intensity of each divided standard image stored in the streak visibility conversion section 22 to determine whether the quality of a printed matter is good or not. For example, the determination section 24 compares the streak intensity with a predetermined threshold value, and then, determines that the quality of the printed matter is good in a case where the streak intensity is equal to or smaller than the threshold value, and determines that the quality of the printed matter is not good in a case where the streak intensity exceeds the threshold value. It is sufficient if the determination section 24 can determine whether the quality of the printed matter is good or not at least on the basis of the streak intensity, and thus, may determine whether the quality of the printed matter is good or not in consideration of factors other than the streak intensity.

Finally, the streak visibility conversion section 22 determines whether the inspection with respect to all the printed matters is terminated, in step S26. In a case where the inspection is not terminated, the procedure proceeds to step S4, and then, the same processes are repeated. In a case where the inspection is terminated with respect to all the printed matters, the processes of the flowchart are terminated.

As described above, by setting a streak near-field area and a streak outer peripheral area in an appropriate range, calculating image feature amounts of the streak near-field area and the streak outer peripheral area, and calculating a streak intensity using a streak visibility model obtained through a sensory evaluation test, it is possible to appropriately determine visibility of a streak.

Figure 24:
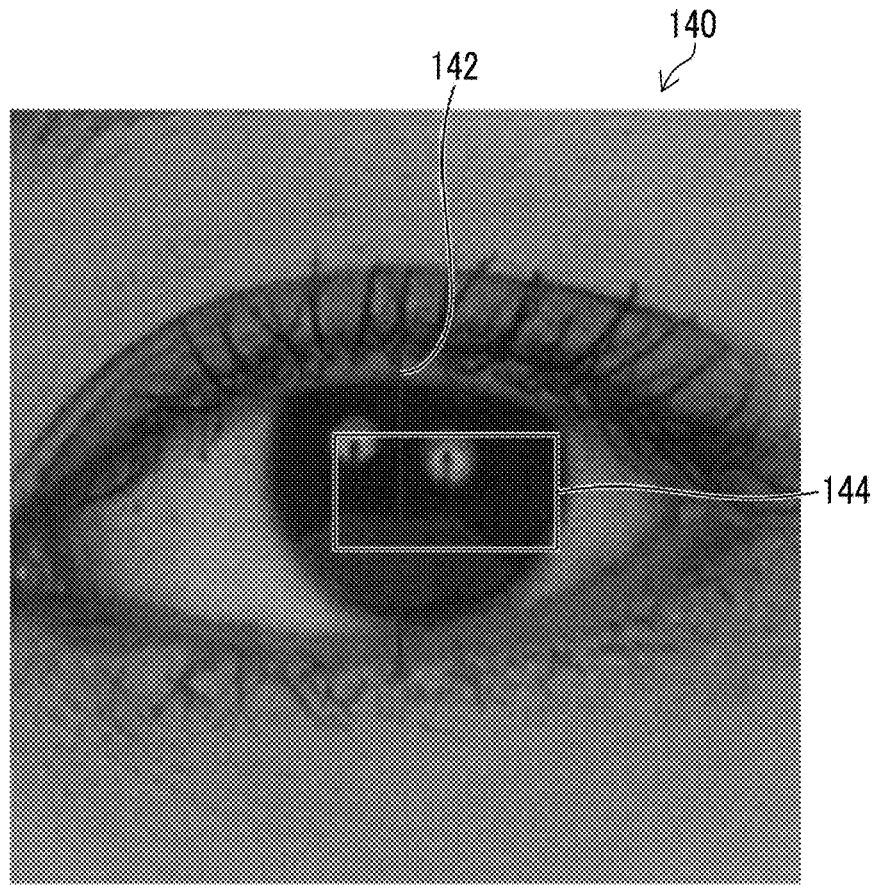
FIG. 24 is a diagram for illustrating a streak near-field area.
Figure 25:
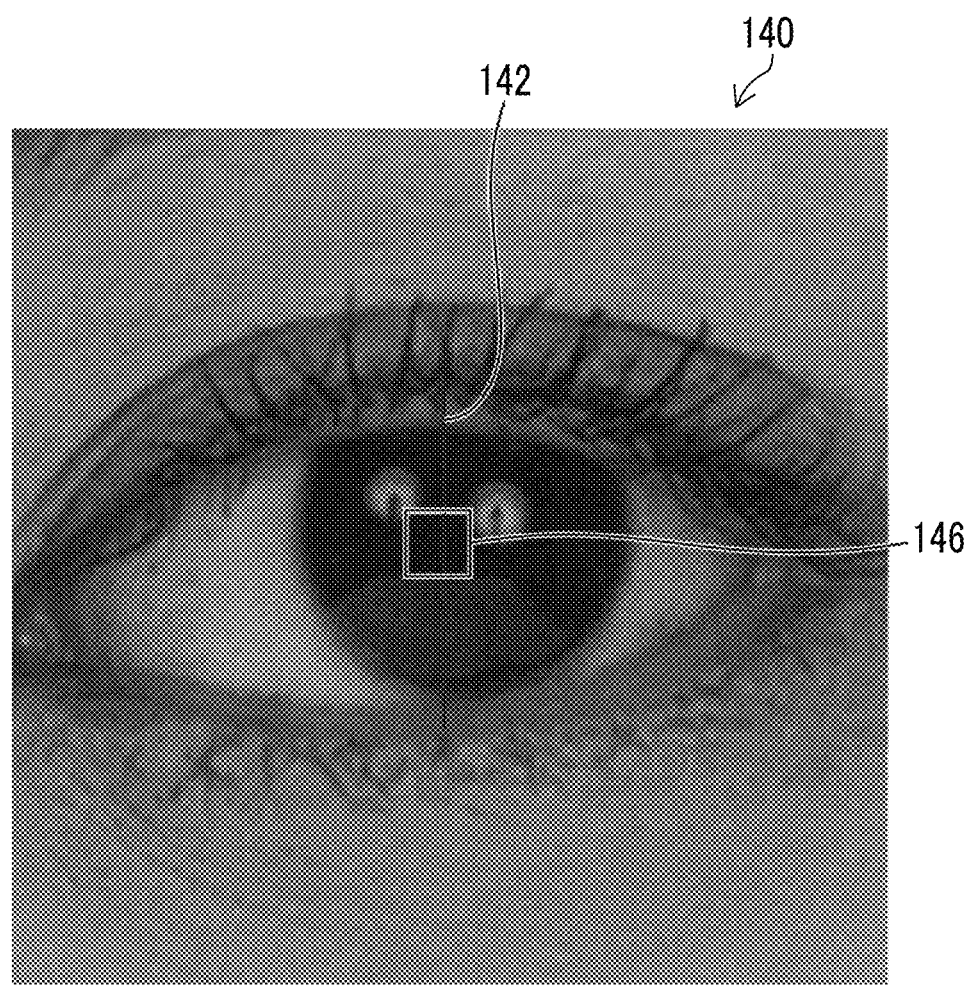
FIG. 25 is a diagram for illustrating a streak near-field area.

FIGS. 24 and 25 are diagrams for illustrating a streak near-field area. In a divided inspection image 140 shown in FIG. 24, a streak 142 is generated. In a case where a streak near-field area 144 for determining an intensity of the streak 142 is set in a range shown in FIG. 24, since a variation of pixel values in the streak near-field area 144 is large, it is not possible to perform an accurate streak intensity determination process. On the other hand, in the divided inspection image 140 shown in FIG. 25, since a streak near-field area 146 set for determining the intensity of the streak 142 has a small variation of pixel values in the streak near-field area 146, it is possible to appropriately determine the visibility of the streak.

Second Embodiment

[Configuration of Printed Matter Inspection Device]

Figure 26:
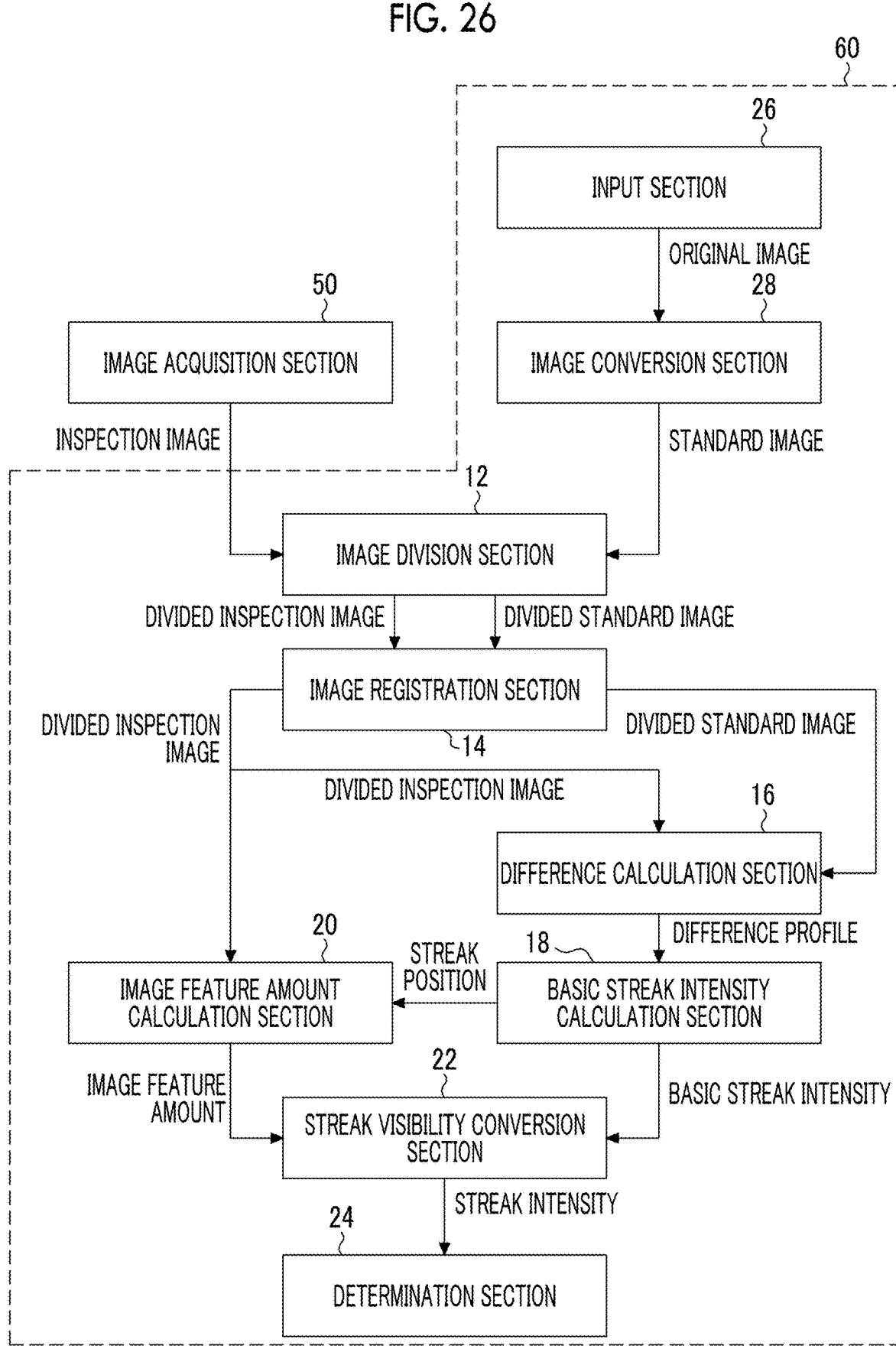
FIG. 26 is a block diagram showing an example of a system configuration of a printed matter inspection device.

FIG. 26 is a block diagram showing an example of a system configuration of a printed matter inspection device 60 according to a second embodiment. As shown in the figure, the printed matter inspection device 60 includes an input section 26 and an image conversion section 28, in addition to the configuration of the printed matter inspection device 10.

The input section 26 is an interface through which image data that is printing source data of an inspection printed matter is input. Further, the image conversion section 28 is an image processing section that generates a standard image from the printing source data acquired through the input section 26. That is, while the standard image of the first embodiment is read-out data of an accepted printed matter, the standard image of the second embodiment is generated from the printing source data.

Further, the image feature amount calculation section 20 calculates an image feature amount for each area of divided inspection images.

Figure 27:
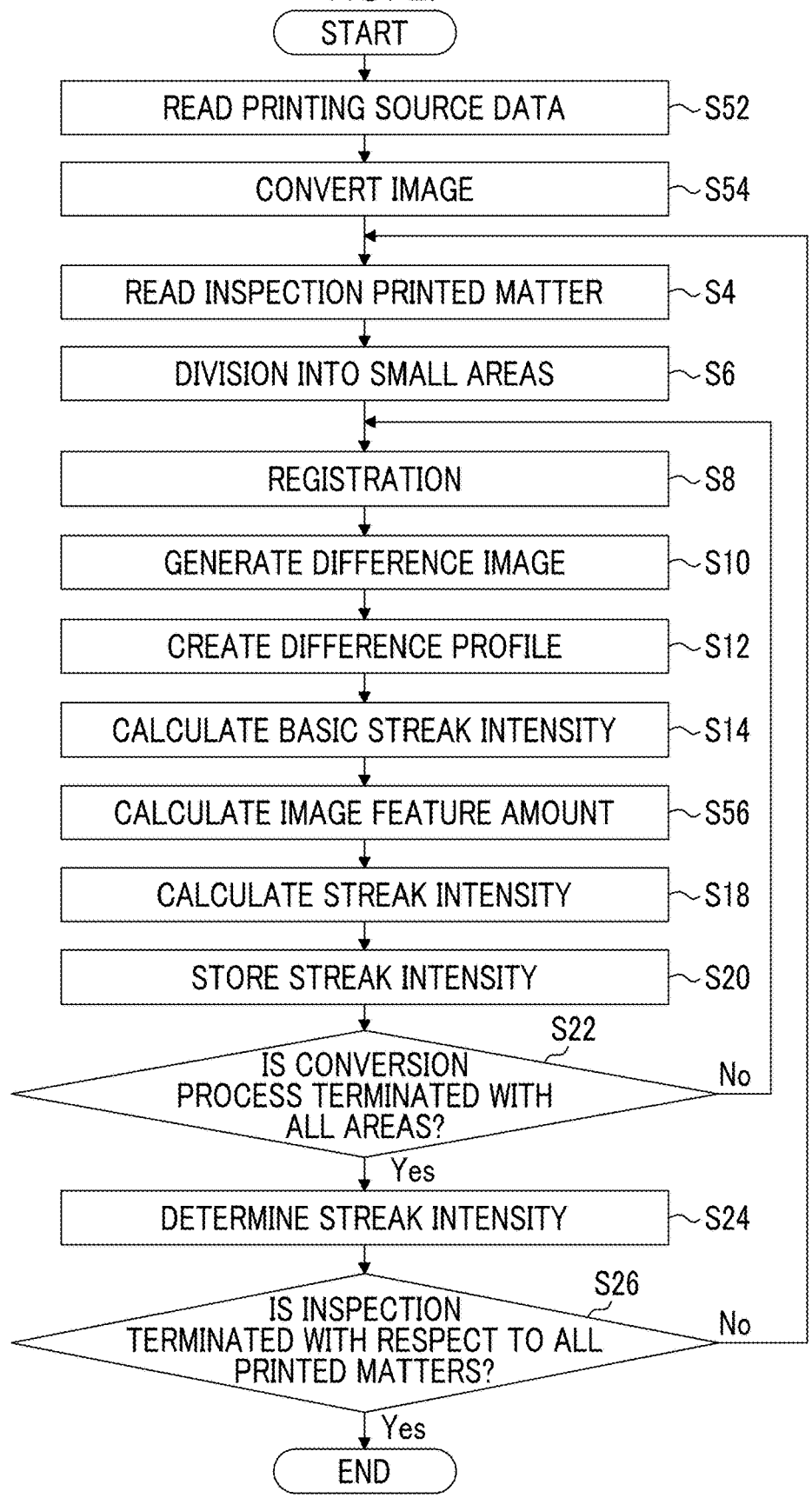
FIG. 27 is a flowchart showing an example of processes of a printed matter inspection method.

FIG. 27 is a flowchart showing an example of a process of the printed matter inspection method according to the second embodiment. The same reference numerals are given to sections common to the flowchart shown in FIG. 18, and detailed description thereof will not be repeated.

First, the input section 26 acquires printing source data that is processed by a raster image processor (RIP), in step S52.

The image conversion section 28 converts a resolution of the printing source data acquired in step S52 into a read resolution of the image acquisition section 50, in step S54. Further, the resolution-converted data is subjected to a color conversion process to generate a standard image that is image data for each of R. G, and B having the read resolution of the image acquisition section 50.

Printing source data of a printing data format may be acquired in step S52, and image processing such as RIP processing may be performed in the image conversion section 28. Further, data obtained by performing RIP processing, resolution conversion, and color conversion processing with respect to the printing source data in advance may be acquired in step S52.

Then, similar to the first embodiment, an inspection image is generated in step S4, the inspection image is divided into a plurality of divided inspection images in step S6, and a standard image is divided into a plurality of divided standard images. Further, a detailed registration process between the divided inspection images and the divided standard images at positions corresponding to positions of the divided inspection images in step S8, difference images between the divided inspection images and the divided standard images are generated in step S10, and difference profiles are created in step S12. The basic streak intensity calculation section 18 calculates a basic streak intensity in step S14.

Subsequently, the image feature amount calculation section 20 calculates an image feature amount of a divided inspection image at a position of a streak detected by the basic streak intensity calculation section 18, in step S56. Since the standard image of this embodiment is generated from the printing source data, in a case where the image feature amount is calculated from the standard image, it is not possible to reflect a texture of a recording medium of a printed matter and a halftone of a printing image. For this reason, the image feature amount is calculated from the divided inspection image.

Thus, pixels at the streak position on the divided inspection image are considered as defect pixel values, and a process of interpolating the pixel values at the streak position from pixel values in the vicinity thereof, through a known streak correction algorithm.

Thereafter, subsequent processes are the same as in the first embodiment.

According to this embodiment, since the basic streak intensity is calculated using the divided inspection images, it is possible to calculate a streak intensity in reflection of a texture of a recording medium of a printed matter and/or a halftone of a printing image.

[Others]

Hereinbefore, a configuration in which an inspection image and a standard image after registration are divided into a plurality of divided inspection images and a plurality of divided standard images, respectively, and a streak intensity is calculated for each divided image has been described, but it is not essential to divide the images, and a configuration in which a streak is detected without division and a streak intensity is calculated may be used.

In the first embodiment and the second embodiment, the image division section 12, the image registration section 14, the difference calculation section 16, the basic streak intensity calculation section 18, the image feature amount calculation section 20, the streak visibility conversion section 22, the determination section 24, the input section 26, the image conversion section 28, the streak near-field area determination section 30, the streak near-field area feature amount calculation section 32, the streak outer peripheral area feature amount calculation section 34, the streak visibility color feature conversion section 36, the streak visibility image structure feature conversion section 40, and the streak visibility complexity conversion section 44 may be configured by one or a plurality of central processing units (CPU), and may be operated by causing the CPU to execute a program by reading out the program stored in a storage section (not shown) provided in the printed matter inspection device.

The printed matter inspection method may be configured as a printed matter inspection program for causing a computer to realize the respective steps, and may be configured in the form of a non-transitory recording medium such as a compact disk-read only memory (CD-ROM) on which a computer-readable code of the printed matter inspection program is stored.

A technical scope of the invention is not limited to the range disclosed in the above-described embodiments. Configurations or the like in the respective embodiments may be appropriately combined between the respective embodiments in a range without departing from the concept of the invention.

EXPLANATION OF REFERENCES

1: image
2: white streak
3: image
4: white streak
10: printed matter inspection device
12: image division section
14: image registration section
16: difference calculation section
18: basic streak intensity calculation section
20: image feature amount calculation section
22: streak visibility conversion section
24: determination section
26: input section
28: image conversion section
30: streak near-field area determination section
32: streak near-field area feature amount calculation section
34: streak outer peripheral area feature amount calculation section
36: streak visibility color feature conversion section
38: storage section
40: streak visibility image structure feature conversion section
42: storage section
44: streak visibility complexity conversion section
46: storage section
50: image acquisition section
60: printed matter inspection device
100: difference image
102: image defect
110: divided standard image
114: streak position
116: streak near-field area
118: contiguous area
120: sensory evaluation sample
122: background image
124: streak
126: background image
130: background image
132: pseudo near-field area
134: pseudo outer peripheral area
140: divided inspection image
142: streak
144: streak near-field area
146: streak near-field area
A: range
B: range
S2 to S26, S52 to S56: printed matter inspection process
S32 to S40: image feature amount calculation process
S42 to S46: streak visibility conversion process

What is claimed is:

1. A printed matter inspection device comprising:
a detection section that detects a streaky concentration defect that extends in a first direction from a printed matter;
an intensity calculation section that calculates a basic streak intensity that is an intensity of the concentration defect;
a streak near-field area specification section that specifies a streak near-field area that is continuous from an area of the concentration defect of the printed matter, in which a variation of image feature amounts is within a predetermined first range;
a streak near-field area information acquisition section that acquires color information and frequency feature information on the streak near-field area;
an outer peripheral area specification section that specifies an outer peripheral area that is in contact with the streak near-field area;
an outer peripheral area information acquisition section that acquires frequency feature information on the outer peripheral area;
a visibility determination section that determines visibility of the concentration defect on the basis of the basic streak intensity, the color information and the frequency feature information on the streak near-field area, and the frequency feature information on the outer peripheral area; and
a determination section that determines whether the quality of the printed matter is good or not at least on the basis of the visibility.

2. The printed matter inspection device according to claim 1,
wherein the color information is information including a brightness, a saturation, and a hue.

3. The printed matter inspection device according to claim 1,
wherein the frequency feature information on the streak near-field area and the frequency feature information on the outer peripheral area are information including a direction and a frequency band.

4. The printed matter inspection device according to claim 1,
wherein the outer peripheral area specification section specifies an outer peripheral area having a predetermined first size.

5. The printed matter inspection device according to claim 1,
wherein the outer peripheral area specification section specifies an outer peripheral area in which the variation of the image feature amounts is within a predetermined second range.

6. The printed matter inspection device according to claim 1,
wherein the visibility determination section includes a model that converts the basic streak intensity into a sensory evaluation value of the concentration defect, on the basis of the color information and the frequency feature information on the streak near-field area and the frequency feature information on the outer peripheral area, and determines the visibility of the concentration defect on the basis of the sensory evaluation value.

7. The printed matter inspection device according to claim 6,
wherein the visibility determination section includes
a first streak model that converts the basic streak intensity and the color information on the streak near-field area into a first streak sensory evaluation value,
a second streak model that converts the first streak sensory evaluation value and the frequency feature information on the streak near-field area into a second streak sensory evaluation value, and
a third streak model that converts the second streak sensory evaluation value and the frequency feature information on the outer peripheral area into a third streak sensory evaluation value, and determines the visibility of the concentration defect on the basis of the third streak sensory evaluation value.

8. The printed matter inspection device according to claim 1, wherein the detection section detects the concentration defect from a difference between standard image data and inspection image data obtained by reading the printed matter.

9. The printed matter inspection device according to claim 8, wherein the detection section divides the standard image data and the inspection image data into a plurality of areas, respectively, and detects the concentration defect from a difference between each divided area of the standard image data and each divided area of the inspection image data.

10. The printed matter inspection device according to claim 8, wherein the variation of the image feature amounts is a value relating to a variance value of pixel values of the inspection image data.

11. The printed matter inspection device according to claim 8, wherein the standard image data is data obtained by reading an accepted printed matter.

12. The printed matter inspection device according to claim 8, wherein the standard image data is printing source data of the printed matter.

13. A printed matter inspection method comprising:

a detection step of detecting a streaky concentration defect that extends in a first direction from a printed matter;

an intensity calculation step of calculating a basic streak intensity that is an intensity of the concentration defect;

a streak near-field area specification step of specifying a streak near-field area that is continuous from an area of the concentration defect of the printed matter, in which a variation of image feature amounts is within a predetermined first range;

a streak near-field area information acquisition step of acquiring color information and frequency feature information on the streak near-field area;

an outer peripheral area specification step of specifying an outer peripheral area that is in contact with the streak near-field area;

an outer peripheral area information acquisition step of acquiring frequency feature information on the outer peripheral area;

a visibility determination step of determining visibility of the concentration defect on the basis of the basic streak intensity, the color information and the frequency feature information on the streak near-field area, and the frequency feature information on the outer peripheral area; and a determination step of determining whether the quality of the printed matter is good or not at least on the basis of the visibility.

14. A computer-readable non-transitory recording medium that stores a printed matter inspection program causing a computer to execute:

a detection step of detecting a streaky concentration defect that extends in a first direction from a printed matter;

an intensity calculation step of calculating a basic streak intensity that is an intensity of the concentration defect;

a streak near-field area specification step of specifying a streak near-field area that is continuous from an area of the concentration defect of the printed matter, in which a variation of image feature amounts is within a predetermined first range;

a streak near-field area information acquisition step of acquiring color information and frequency feature information on the streak near-field area;

an outer peripheral area specification step of specifying an outer peripheral area that is in contact with the streak near-field area;

an outer peripheral area information acquisition step of acquiring frequency feature information on the outer peripheral area;

a visibility determination step of determining visibility of the concentration defect on the basis of the basic streak intensity, the color information and the frequency feature information on the streak near-field area, and the frequency feature information on the outer peripheral area; and a determination step of determining whether the quality of the printed matter is good or not at least on the basis of the visibility.

* * * * *